(12) United States Patent
Mishalov et al.

(10) Patent No.: US 10,228,781 B2
(45) Date of Patent: Mar. 12, 2019

(54) RESISTIVE FORCE SENSOR

(71) Applicant: Microsoft Technology Licensing, LLC, Redmond, WA (US)

(72) Inventors: Vadim Mishalov, Tel Aviv (IL); Ahia Peretz, Ramat-Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 15/169,286

(22) Filed: May 31, 2016

(65) Prior Publication Data
US 2017/0344134 A1 Nov. 30, 2017

(51) Int. Cl.
| | |
|---|---|
| *G06F 3/0354* | (2013.01) |
| *G06F 3/038* | (2013.01) |
| *G01L 1/18* | (2006.01) |
| *G01L 1/20* | (2006.01) |
| *G01L 5/00* | (2006.01) |
| G06F 3/033 | (2013.01) |

(52) U.S. Cl.
CPC .............. *G06F 3/0383* (2013.01); *G01L 1/18* (2013.01); *G01L 1/20* (2013.01); *G01L 5/0038* (2013.01); *G06F 3/03545* (2013.01); *G06F 3/033* (2013.01)

(58) Field of Classification Search
CPC ..... G06F 3/033; G06F 3/0416; G06F 3/03545
USPC ............................... 345/174, 179; 178/19.04
See application file for complete search history.

(56) References Cited

U.S. PATENT DOCUMENTS 4,786,764 A * 11/1988 Padula ................ G06F 3/03545
178/19.04
4,896,543 A    1/1990 Gullman
(Continued)

FOREIGN PATENT DOCUMENTS

CN 100368974 C 2/2008
EP 0722150 A1 7/1996
(Continued)

OTHER PUBLICATIONS

Kearney, Paul, "The PDA Challenge—Met by the AD7873 Resistive-Touch-Screen Controller ADC", In Journal of Analog Dialogue, vol. 35, No. 4, Aug. 2001, 10 pages.
(Continued)

*Primary Examiner* — Abdul-Samad A Adediran
(74) *Attorney, Agent, or Firm* — Holzer Patel Drennan

(57) ABSTRACT

A resistive force sensor may be configured with two exposed pads, each exposed pad electrically connected to a terminal. When a force is applied to a force applicator, a conductive pad moves into contact with the exposed pads, thus completing an electrical circuit and providing a precise measurement of the point in time when a user has supplied sufficient force to switch the apparatus from one mode of operation to another. In another implementation, two resistive sensors may be disposed above and below portions of a conductive pad with an elastic member disposed between the two resistive sensors. When a force is applied to the force applicator of the apparatus, a differential resistance may be calculated between the two resistive sensors. Since resistive sensors may experience thermal drift due to changes in environmental temperature conditions, the differential resistance between the two resistive sensors allows a temperature-independent measurement of force.

20 Claims, 11 Drawing Sheets

(56) References Cited

U.S. PATENT DOCUMENTS

| | | | |
|---|---|---|---|
| 5,981,883 | A | 11/1999 | Shriver |
| 6,101,883 | A | 8/2000 | Takeuchi |
| 6,529,189 | B1 | 3/2003 | Colgan et al. |
| 6,647,794 | B1 | 11/2003 | Nelson et al. |
| 7,337,085 | B2 | 2/2008 | Soss |
| 7,908,921 | B2 | 3/2011 | Binda et al. |
| 8,287,204 | B2 | 10/2012 | Silverbrook et al. |
| 8,536,471 | B2 | 9/2013 | Stern et al. |
| 8,648,837 | B1 | 2/2014 | Tran et al. |
| 9,128,541 | B2 | 9/2015 | Fergusson et al. |
| 9,218,073 | B1 | 12/2015 | Kremin et al. |
| 2006/0181525 | A1 | 8/2006 | Larsen et al. |
| 2009/0044640 | A1 | 2/2009 | Vassilev et al. |
| 2010/0212976 | A1 | 8/2010 | Baba |
| 2013/0106717 | A1 | 5/2013 | Sundara-Rajan et al. |
| 2013/0106798 | A1 | 5/2013 | Sundara-Rajan et al. |
| 2013/0135220 | A1 | 5/2013 | Alameh et al. |
| 2013/0226504 | A1 | 8/2013 | George et al. |
| 2014/0028633 | A1* | 1/2014 | Mercea .................... G06F 3/033 345/179 |
| 2014/0050516 | A1 | 2/2014 | Lazaridis et al. |
| 2015/0070330 | A1* | 3/2015 | Stern .................... G06F 3/03545 345/179 |
| 2015/0261264 | A1 | 9/2015 | Brown et al. |
| 2016/0070374 | A1* | 3/2016 | Hamaguchi ............ G06F 3/0416 345/174 |
| 2016/0179222 | A1 | 6/2016 | Chang |
| 2016/0313839 | A1 | 10/2016 | Hou |
| 2017/0108953 | A1* | 4/2017 | Mao .................... G06F 3/03545 |

FOREIGN PATENT DOCUMENTS

| | | | |
|---|---|---|---|
| JP | S6344222 | A | 2/1988 |
| JP | 3708170 | B2 | 10/2005 |
| WO | 2013153551 | A1 | 10/2013 |
| WO | 2014188417 | A2 | 11/2014 |

OTHER PUBLICATIONS

Harrison, et al., "Providing Dynamically Changeable Physical Buttons on a Visual Display", In Proceedings of the SIGCHI Conference on Human Factors in Computing Systems, Apr. 6, 2009, pp. 299-308.

Damilano, et al., "A Flexible Low-Power 130 nm CMOS Read-Out Circuit with Tunable Sensitivity for Commercial Robotic Resistive Pressure Sensors", In IEEE Sensors Journal, vol. 15, No. 11, Nov. 2015, pp. 6650-6658.

Tenzer, et al., "The Feel of MEMS Barometers", In Journal of IEEE Robotics & Automation Magazine, Sep. 2014, pp. 89-95.

Eswaran, et al., "MEMS Capacitive Pressure Sensors", In International Journal of Engineering and Technology, vol. 5, No. 3, Jun. 2013, pp. 2734-2746.

Han, et al., "Smooth Contact Capacitive Pressure Sensors in Touch- and Peeling-Mode Operation", In IEEE Sensors Journal, vol. 9, No. 3, Mar. 2009, pp. 199-206.

Chavan, et al., "Batch-Processed Vacuum-Sealed Capacitive Pressure Sensors", In Journal of Microelectromechanical Systems, vol. 10, No. 4, Dec. 2001, pp. 580-588.

International Searching Authority, U.S. Patent and Trademark Office, International Search Report and Written Opinion for PCT/US2017/033437 dated Aug. 21, 2017, 18 pages.

International Searching Authority, U.S. Patent and Trademark Office, International Search Report and Written Opinion for PCT/US2017/033443 dated Aug. 22, 2017, 44 pages.

Fassett, et al., "Fluid Pressure Force Sensor Interface", U.S. Appl. No. 15/170,500, filed Jun. 1, 2016, 47 pages.

Mishalov, et al., "Force Sensor Apparatus", U.S. Appl. No. 15/169,408, filed May 31, 2016, 47 pages.

* cited by examiner

RESISTIVE FORCE SENSOR

RELATED APPLICATION

The present application is related to commonly-assigned, U.S. patent application Ser. No. 15/169,408, U.S. Pat. No. 10,048,778, issued Aug. 14, 2018, entitled "Force Sensor Apparatus," which is filed concurrently herewith, and specifically incorporated by reference for all that it discloses and teaches.

BACKGROUND

Electronic devices, especially tablets or smart phones, may accept input via hand-held peripheral devices, such as a stylus. A stylus may be held manually by a user in relation to a screen to provide input to the electronic device. The stylus may employ sensors to measure the amount of force applied by the user at the tip of the stylus against a surface of the electronic device. Measurements from the sensors on the stylus of an applied force may experience thermal drift when environmental conditions include changes in temperature. Thermal drift may lead to inaccuracies and diminished user experience because the force needed to provide input to the electronic device may differ from the user's expectations in conditions of changing environmental temperatures. Thermal drift may also cause sensors in a stylus to imprecisely distinguish the point at which the user begins to apply a force to the tip.

SUMMARY

The described technology provides a resistive force sensor apparatus. A resistive force sensor may be configured with exposed pads. When a force is applied to a force applicator, a conductive pad moves into contact with the exposed pads, thus completing an electrical circuit. The completed electrical circuit provides a precise measurement of the point in time when a user has supplied sufficient force to switch the apparatus from one mode of operation to another because the measured resistance will jump in a manner similar to a step-function when the circuit completes. Precise measurement is possible regardless of the magnitude of the measured resistance, which may be skewed by thermal drift. In another implementation, the stylus may include two pairs of terminals, each pair in a separate electrical circuit. One pair of terminals may precisely sense the moment of contact with a conductive pad, and the other pair of terminals may measure a change in resistance corresponding to a force applied to a force applicator. In yet another implementation, two resistive sensors may be disposed above and below portions of an elastic pad disposed between two resistive sensors. When a force is applied to the force applicator of the apparatus, a differential resistance may be calculated between the two resistive sensors. Since the resistive sensors may experience thermal drift due to changes in environmental temperature conditions, the differential resistance between the two resistive sensors allows a temperature-independent measurement of force applied to the tip of the apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
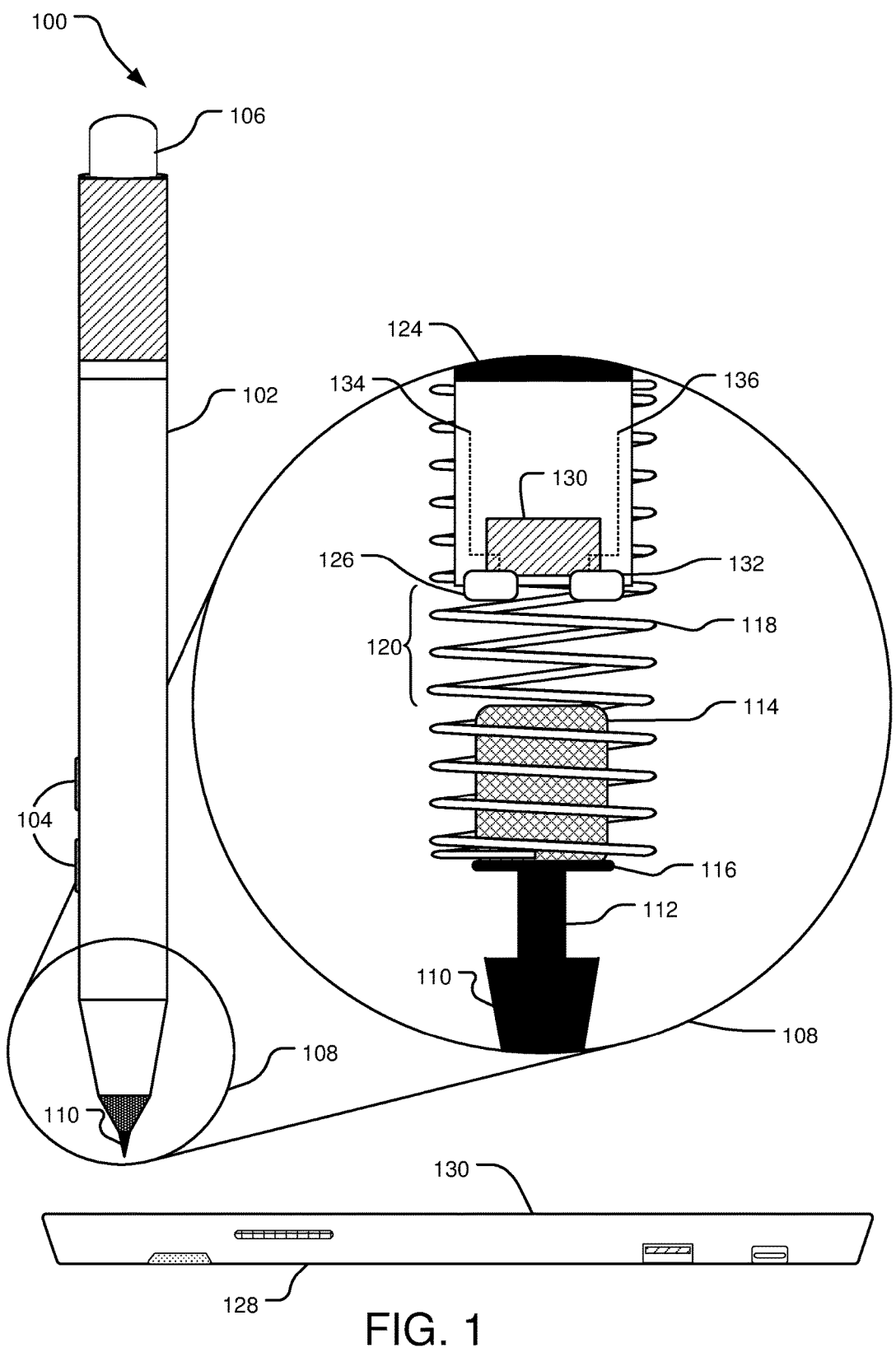
FIG. 1 illustrates an example stylus with a resistive sensor in a hover mode.

The resistive force sensor apparatus may be part of a hand-held stylus peripheral for use with electronic devices, including smart phones, tablets, watches, desktop computers, gaming devices, wearable devices, televisions, video conferencing systems, etc. The stylus is equipped with a force sensor for measuring a force applied to the tip. Throughout this application, references to a resistive sensor or a force sensor may include other types of sensors, such as a MEMS sensor. The resistive sensor may be arranged with one or more exposed pads electrically connected to the resistive sensor for engagement with a conductive pad. The conductive pad may be disposed on a shaft connected to the tip of the stylus. A circuit may be completed when the conductive pad contacts the exposed pads of the resistive sensor. When the circuit is completed, the electrical current may step-up or jump from a zero or near zero level to a substantially higher level. The step-up in current precisely indicates the point in time that contact is made between the conductive pad and the exposed pads, which may indicate that the stylus should begin "drawing," as explained below. As the applied force on the tip increases, the resistive sensor materials are physically deformed by the force, and the applied force may be measured based on the change in resistance after the initial point of contact between the conductive pad and the terminals (i.e., after the step-up in current). Throughout this disclosure, reference to measurement of a change in resistance may also refer to measurement of a change in current due to the inverse relationship between resistance and current according to Ohm's law. In an implementation, the apparatus includes an ammeter to measure current. In another implementation, the apparatus includes an ohmmeter to measure resistance. In yet another implementation, the apparatus includes a multimeter to measure current, resistance, and/or voltage. Although implementations described herein refer to a stylus device with a tip, these implementations may be applied to any type of device with a force applicator and a sensor configured to measure force on the force applicator rather than on a tip of a stylus.

The stylus peripheral may communicate user input to an electronic device. The stylus may be powered by a battery, which may be a rechargeable battery, a replaceable battery, or a disposable battery. The stylus may include, as explained in more detail below, capabilities to support one or more wired or wireless communications protocols. In one implementation, antennas may be disposed inside or outside the stylus to communicate with electronic devices according to a variety of communications protocols. The stylus may include features such as one or more physical buttons selectable by a user. In one implementation, they stylus may include a clip that may also function as a physical button, an antenna, or an information indicator such as, for example but without limitation, by including an LED light or display. In implementations, the stylus may include user feedback features such as haptic feedback, audio alerts through one or more audio speakers, vibration user feedback, etc.

The stylus may communicate with an electronic device according to a variety of methods. In one implementation, the stylus may contain a Bluetooth™ antenna and communicate with an electronic device according to the Bluetooth™ wireless protocol. In another implementation, the stylus may contain a Wi-Fi antenna and communicate, directly or indirectly, with an electronic device according to one or more Wi-Fi wireless protocols. In other implementations, the stylus may communicate with an electronic device according to a wired connection, for example without limitation a Universal Serial Bus (USB) connection. The stylus may utilize one of the aforementioned communications protocols, or similar communications protocols, to communicate a variety of data to an electronic device. In one implementation, the stylus may pair with an electronic device according to one of the communications protocols. Further, and as explained in more detail below, the stylus may communicate data to an electronic device including position data, mode of operation data, input data, etc.

The stylus may advantageously allow a memory for on board storage of user files received via a wired or wireless connection to the electronic device. The stylus may contain a processor configured to execute code stored on the memory such as operating system code or code downloaded to the stylus over a digital communications channel. The stylus may further advantageously contain a glass display to determine or display to the user any of the following: the power status of the battery, the current wireless signal strength, or other information relating to an electronic device configured to receive user input from the stylus.

The stylus may operate according to one or modes of operation. The stylus may determine an appropriate mode of operation based on environmental conditions that may be sensed according to one or more sensors on the stylus. In another implementation, the stylus may determine an appropriate mode of operation according to an internal metric, for example without limitation, if a predetermined amount of time has passed since the stylus has received an input from the user or data from a paired device. In yet another implementation, a mode of operation may be selected by the user, for example without limitation, by pushing a button or switch on the device or by causing a sensor on the device to receive an input.

One mode of operation may be a stand-by mode, such as a low power mode or sleep mode. The stylus may enter stand-by mode, for example, when the stylus has been idle for a predetermined amount of time. Stand-by mode may conserve battery power by cutting power to unneeded subsystems of the stylus. The stylus may be woken up from stand-by mode by the user in a variety of ways, such as pressing a button on the stylus housing or applying pressure to the tip. In another implementation, the stylus may be awoken from stand-by mode or powered on remotely, such as by connecting a cable or wirelessly via a Bluetooth™ connection, a Wi-Fi connection, NFC communications, activation of an on-board sensor such as an accelerometer, heat sensor, noise sensor, or temperature sensor.

Another mode of operation of the stylus may be an active mode. In active mode, the various subsystems on-board the stylus may be powered up. For example, without limitation, a communications system may power up in active mode, and attempt to establish a connection with an electronic device. The stylus may also include a hover mode. In hover mode, a user may control the position of a pen cursor or pointer by directing the tip of the stylus at the screen of the electronic device without making physical contact with the screen. The stylus may detect hover mode when there is no pressure applied to the tip, but the stylus is within a predetermined distance from the screen of the electronic device.

Another mode of the stylus may be an ink mode. The stylus may operate in ink mode when a pressure is applied to the tip of the stylus sufficient to satisfy an ink condition. The ink condition may be, for example without limitation, a minimum force applied to the stylus tip. Ink mode may be used to select an area of the screen of the electronic device indicated by the position of the tip. In ink mode, the electronic device may interpret input as drawing on the screen, such as for drawing a figure or when writing text. The stylus may sense various weights of ink depending on the amount of pressure applied to the stylus tip. For example, a light touch may indicate a relatively finer line should be drawn on the device. As the user increases pressure on the stylus, the weight of the line may increase accordingly. The stylus may therefore detect a binary condition indicating whether the stylus should draw or hover, and also, in ink mode, detect a pressure to indicate the weight of a line to be drawn. In one implementation, the stylus may sense 1024 or more discrete weights depending on the amount of pressure applied to the stylus against the screen of the electronic device.

FIG. 1 illustrates an example stylus 100 in a hover mode. The stylus 100 includes a stylus body 102. In an implementation, the stylus body 102 may be formed of a material suitable for enclosing the components described herein. The stylus body 102 may be formed from, for example without limitation, plastic, rubber, metal, carbon fiber, etc., and/or any combinations thereof. In an implementation, the stylus 100 may include one or more physical buttons 104 selectable by a user. Selection of one of the physical buttons 104 may cause a user input to be transmitted to the stylus 100. For example, without limitation, selection of a physical button 104 may select an application program executing on an electronic device with which the stylus communicates according to a wired or wireless communication protocol. Physical buttons 104 may wake the pen from standby mode and/or activate menus and/or other user interface designs on an application executing on an electronic device. In another implementation, physical buttons 104 may select or "click" an element on a graphical user interface on the electronic device via a cursor. In other implementations, the stylus 100 may include a cap button 106. The cap button 106 may be a physical button selectable by the user, and may perform any of the aforementioned functions mentioned with respect to buttons 104. The stylus 100 may include one or more friction areas for facilitating the user's grip and manipulation, such as, for example, a rubber friction area or textured area to increase friction with a user's hand and/or fingers. In an implementation, the stylus 100 includes a tip 110. The tip 110 may be positioned at the distal end of the stylus 100 on the opposite end of the stylus from the physical button 106.

In FIG. 1, components housed inside stylus body 102 are shown in greater detail in bubble 108. Other components in addition to those shown in bubble 108 may be present inside stylus body 102, including without limitation inside stylus body 102 at the distal end near the tip in the area depicted by bubble 108. In an implementation, a tip 110 extends beyond the distal end of the stylus body 102, and is mechanically coupled to a tip holder shaft 112. The tip holder shaft 112 may be vertically disposed inside stylus housing 102. The tip holder shaft 112 and tip 110 may be slidably coupled to the interior of stylus housing 102. When a user applies pressure to tip 110, such as, for example, by pressing the stylus 100 onto the surface 130 of an associated electronic device 128, the tip 110 and tip holder shaft 112 may slide in concert inside stylus body 102. The tip holder shaft 112 may be mechanically coupled to a support member 116. The support member 116 may support a conductive pad 114. The conductive pad 114 may be formed from a variety of conductive materials. In an implementation, the conductive pad 114 is formed from a deformable conductive material, including without limitation silicon, paraffin wax, etc. In another implementation, the conductive pad 114 may be formed from a non-conductive deformable material such as rubber, and coated with a conductive material. In yet another implementation, the conductive pad 114 may be formed from a material having electrical properties that depend on the magnitude of an applied force, such as silicone contaminate with carbon particles or piezo resistive particles.

The support member 116 may be connected to a spring 118 extending between the support member 116 and a central shaft 124. The spring 118 may be disposed inside the stylus body 102, such that the spring 118 will compress axially when a force is applied via tip 110 and tip holder shaft 112. In one implementation, the spring 118 is a pre-loaded spring. The spring 118 may be pre-loaded to a desired amount according to a number of methods. For example, the spring 118 may be pre-loaded using pre-load spacers added to one or both ends of spring 118, or by using threaded pre-load assemblies, etc. Increasing the amount of pre-loading on spring 118 will increase the force that must be applied to tip holder 112 via tip 110 to move the spring from a pre-loaded position. In one implementation, the pre-load is greater than the weight of the tip 110, the tip holder shaft 112, and any other components slidably connected to the interior of stylus housing 102, such that the tip 110 will remain in a fully extended position when the user holds the stylus 100 in any orientation, such as a vertical orientation. In this implementation, the tip 110 will remain fully extended when the user applies force to the tip 110, such as when the user wishes to provide input to an electronic device by writing on the surface of the device with the stylus 100, until such time that the user applies more force to the tip 110 than the amount of pre-loading on spring 118. When the user applies more force to the tip 110 than the amount of pre-loading on spring 118, the tip holder shaft 112 will begin to compress spring 118. It should be understood that the components shown in the figures disclosed herein, including the conductive pad 114, resistive sensor 130, exposed pads 126, 132, terminals 134, 136, in all implementations, may be disposed inside the spring 118. For ease of reference and clarity, some or all components may be depicted as being in front of the spring 118 in the figures.

When the tip 110 is fully extended from the distal end of the stylus 100, such as, for example, when the spring 118 is a pre-loaded spring and the force on the tip 110 is less that the pre-load of the spring 118, then the conductive pad 114 is physically separated by an air gap 120 from exposed pads 126, 132, which are electrically coupled to terminals of a resistive sensor 130, which may be disposed below or fixedly connected to the central shaft 124. When the conductive pad 114 contacts the exposed pads 126, 132, an electrical circuit may be completed including the conductive pad 114, the exposed pads 126, 132, the resistive sensor 130 and additional components. Completion of the electrical circuit provides a precise measurement of the point in time when an applied force on the tip is sufficient to move the conductive pad 114 into contact with the exposed pads 126, 132 because the current in the completed circuit will resemble a step-function where current is zero or near zero until a step-up or jump at the point in time the circuit is completed. In an implementation, the point in time when an electrical circuit is completed indicates a switch between modes of the stylus 100, such as from a hover mode to an ink mode. In an implementation, resistive sensor 130 may be formed of the same material as conductive pad 114. In other words, conductive pad 114 may also change its resistance according to the applied force.

After the circuit has been completed by contact between the conductive pad 114 and the exposed pads 126, 132, change in resistance may be measured at terminals 134, 136, at the end of electrical traces or lines shown in dotted lines. The accuracy of the measurement of the point in time when the conductive pad 114 contacts the exposed pads 126, 132, and subsequent measurements of the force applied to the tip due to a change in resistance or current, is independent of the environmental temperature of the stylus 100 because the resistive sensor 130 may be dynamically calibrated at the point of contact to compensate for any thermal drift experienced by the resistive sensor. In other words, the measured resistance (or current) at the resistive sensor 130 may resemble a step-function wherein the measured resistance (or current) remains at zero or near zero while the circuit is broken, then steps up to a measured level when the circuit has been completed. The magnitude of the step-up is not relevant to the measurement of force applied to the tip 110 because the sensor need only measure the increase in resistance (or current) after the step-up. Any thermal drift experienced by the resistive sensor 130 may be cancelled at the point of contact because the sensor may be effectively "zeroed out" to the magnitude of the resistance measured when the circuit is completed. To accurately measure increasing force on the tip 110, it is only necessary to measure the change in resistance (or current) at the resistive sensor 130 after the circuit has been completed, independent of the magnitude of the measured resistance.

Figure 2:
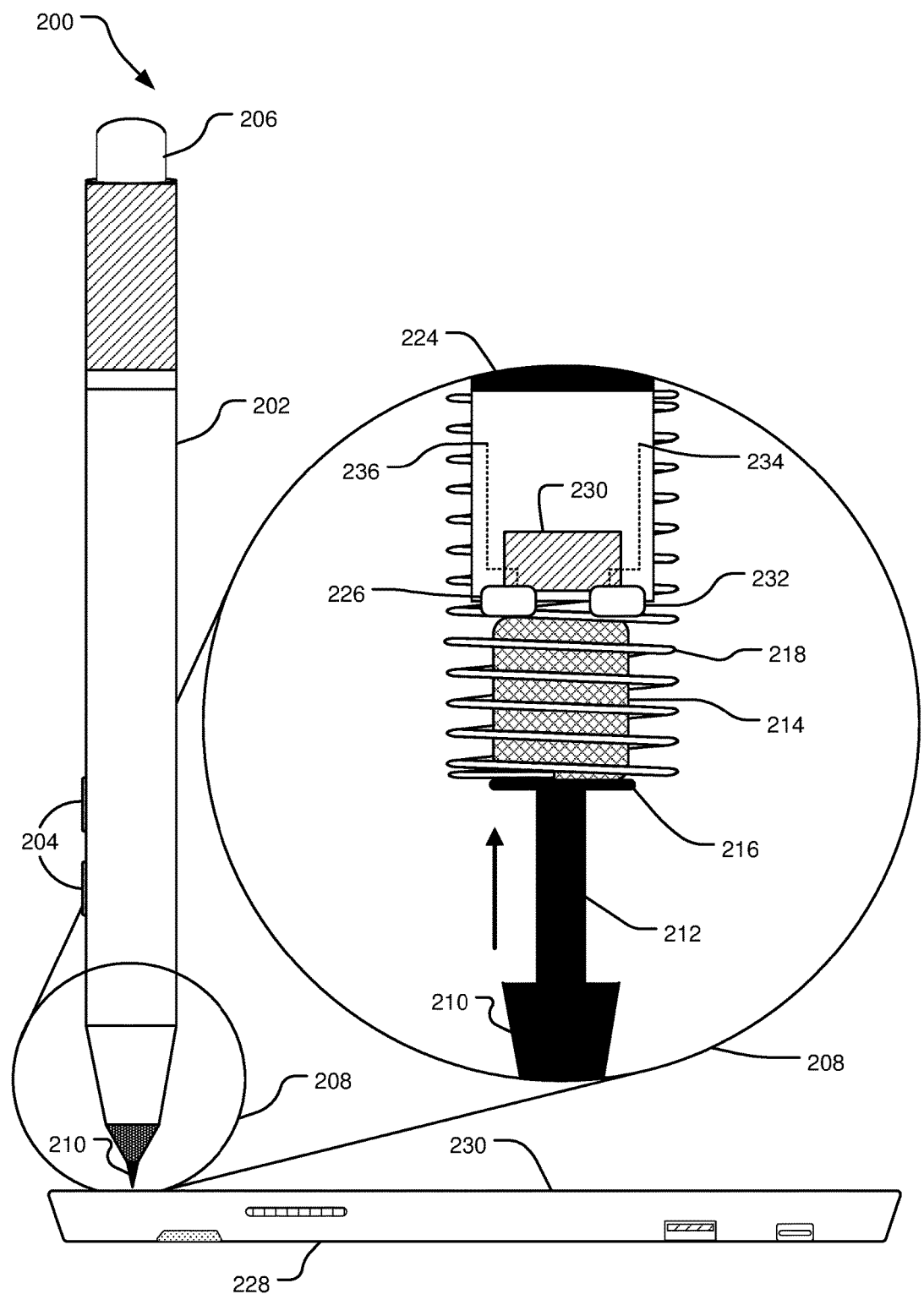
FIG. 2 illustrates an alternative view of an example stylus with a resistive sensor connected to exposed terminals in a switch configuration in a hover mode.

FIG. 2 illustrates another example stylus 200 in an ink mode. The stylus 200 includes a stylus body 202. The stylus body 202 may be formed of a material suitable for enclosing the components described herein. The stylus body 202 may be formed from, for example without limitation, plastic, rubber, metal, carbon fiber, etc., and/or any combinations thereof. In an implementation, the stylus 200 may include one or more physical buttons 204 selectable by a user. Selection of one of the physical buttons 204 may cause a user input to be transmitted to the stylus 200. For example, without limitation, selection of a physical button 204 may select an application program executing on an electronic device with which the stylus communicates according to a wired or wireless communication protocol. Physical buttons 204 may wake the pen from standby mode and/or activate menus and/or other user interface designs on an application executing on an electronic device. In another implementation, physical buttons 204 may select or "click" an element on a graphical user interface on the electronic device via a cursor. In other implementations, the stylus 200 may include a cap button 206. The cap button 206 may be a physical button selectable by the user, and may perform any of the aforementioned functions mentioned with respect to buttons 204. The stylus 200 may include one or more friction areas for facilitating the user's grip and manipulation, such as, for example, a rubber friction area or textured area to increase friction with a user's hand and/or fingers. In an implementation, the stylus 200 includes a tip 210. The tip 210 may be positioned at the distal end of the stylus 200 on the opposite end of the stylus from the physical button 206.

In FIG. 2, components housed inside stylus body 202 are shown in greater detail in bubble 208. Other components in addition to those shown in bubble 208 may be present inside stylus body 202, including without limitation inside stylus body 202 at the distal end near the tip in the area depicted by bubble 208. In an implementation, top 210 is mechanically coupled to a tip holder shaft 212 vertically disposed inside stylus housing 202. The tip holder shaft 212 and tip 210 may be slidably coupled to the interior of stylus housing 202. When a user applies pressure to tip 210, such as, for example, by pressing the stylus 200 onto the surface 230 of an associated electronic device 232, the tip 210 and tip holder shaft 212 may slide in concert inside stylus body 202. The tip holder shaft 212 may be mechanically coupled to a support member 216. The support member 216 may support a conductive pad 214. The conductive pad 214 may be formed from a variety of conductive materials. In an implementation, the conductive pad 214 is formed from a deformable conductive material, including without limitation silicon, paraffin wax, etc. In another implementation, the conductive pad 214 may be formed from a non-conductive deformable material such as rubber, and coated with a conductive material. In yet another implementation, the conductive pad 214 may be formed from a material having electrical properties that depend on the magnitude of an applied force, such as silicone contaminate with carbon particles or piezo resistive particles.

The support member 216 may be connected to a spring 218 extending between the support member 216 and a central shaft 224. The spring 216 may be disposed inside the stylus body 202, such that the spring 216 will compress axially when a force is applied via tip 210 and tip holder shaft 212. In one implementation, the spring 218 is a pre-loaded spring. The spring 218 may be pre-loaded to a desired amount according to a number of methods. For example, the spring 218 may be pre-loaded using pre-load spacers added to one or both ends of spring 218, or by using threaded pre-load assemblies, etc. Increasing the amount of pre-loading on spring 218 will increase the force that must be applied to tip holder 212 via tip 210 to move the spring from a pre-loaded position. In one implementation, the pre-load is greater than the weight of the tip 210, the tip holder shaft 212, and any other components slidably connected to the interior of stylus housing 202, such that the tip 210 will remain in a fully extended position when the user holds the stylus 200 in any orientation, such as a vertical orientation. In this implementation, the tip 210 will remain fully extended when the user applies force to the tip 210, such as when the user wishes to provide input to an electronic device by writing on the surface of the device with the stylus 200, until such time that the user applies more force to the tip 210 than the amount of pre-loading on spring 218. When the user applies more force to the tip 210 than the amount of pre-loading on spring 218, the tip holder shaft 212 will begin to compress spring 218.

When the tip 210 is fully extended from the distal end of the stylus 200, such as, for example, when the spring 218 is a pre-loaded spring and the force on the tip 210 is less that the pre-load of the spring 218, then the conductive pad 214 is physically separated by an air gap 220 from exposed pads 226, 232, which are electrically coupled to terminals 234, 236 of a resistive sensor 230, which may be disposed on the central shaft 224. When the conductive pad 214 contacts the exposed pads 226, 232, an electrical circuit may be completed including the conductive pad 214, the exposed pads 226, 232, the resistive sensor 230 and additional components. Completion of the electrical circuit provides a precise measurement of the point in time when an applied force on the tip is sufficient to move the conductive pad 214 into contact with the exposed pads 226, 232 because the current in the completed circuit will resemble a step-function where current is zero or near zero until a step-up or jump at the point in time the circuit is completed. In an implementation, the point in time when an electrical circuit is completed indicates a switch between modes of the stylus 200, such as from a hover mode to an ink mode.

After the circuit has been completed by contact between the conductive pad 214 and the exposed pads 226, 232, change in resistance may be measured at terminals 234, 236 at the end of electrical traces or lines shown in dotted lines. The accuracy of the measurement of the point in time when the conductive pad 214 contacts the exposed pads 226, 232, and subsequent measurements of the force applied to the tip due to a change in resistance or current, is independent of the environmental temperature of the stylus 200 because the resistive sensor 230 may be dynamically calibrated at the point of contact to compensate for any thermal drift. In other words, the measured resistance (or current) at the resistive sensor 230 may resemble a step-function wherein the measured resistance (or current) remains at zero or near zero while the circuit is broken, then steps up to a measured level when the circuit has been completed. The magnitude of the step-up is not relevant to the measurement of force applied to the tip 210 because the sensor need only measure the increase in resistance (or current) after the step-up. Any thermal drift experienced by the resistive sensor 230 may be cancelled at the point of contact because the sensor may be effectively "zeroed out" to the magnitude of the resistance measured when the circuit is completed. To accurately measure increasing force on the tip 210, it is only necessary to measure the change in resistance (or current) at the resistive sensor 230 after the circuit has been completed, independent of the magnitude of the measured resistance.

In another embodiment, the conductive pad 214 contacts the exposed pad 226 after enough force has been applied to tip 210 to overcome the spring 218's pre-load (if any) and to compress the spring 218. Since the conductive pad 214 may be deformable, continued increasing of the force applied to tip 210 may deform conductive pad 214 until the conductive pad 214 also contacts exposed pad 232, which may be disposed below exposed pad 226. In another embodiment, the conductive pad 214 is narrower than the physical separation between exposed pads 226, 232. When sufficient force is applied to tip 210 to overcome the pre-load on spring 218 (if any) and compress spring 218, the conductive pad may become positioned vertically between exposed pads 226, 232, but without physically touching either. The stylus 200 may measure the change in equivalent resistance between the exposed pads 226, 232 as the conductive pad 214 moves therebetween. The resistance and/or current in the circuit including the exposed pads 226, 232 may be measured in the same way as when the conductive pad 214 contacts the exposed pads 226, 232.

In another implementation, the exposed pads 226, 232 may be disposed at varying heights with respect to the conductive pad 214, and the exposed pads 226, 232 may be included in electrically separate circuits. When the conductive pad 214 contacts one of the two exposed pads, it may complete a circuit including the contacted pad, and resistance and/or current may be measured to sense the force exerted on the pad. The non-contacted pad may remain as a reference sensor for comparison to the contacted pad. In this implementation, the exposed pads 226, 232 may be capable of temperature-immune measurements because both exposed pads, and therefore both terminals of the resistive sensor 230, may remain at the same temperature and will be skewed equally by the environmental temperature.

Figure 3:
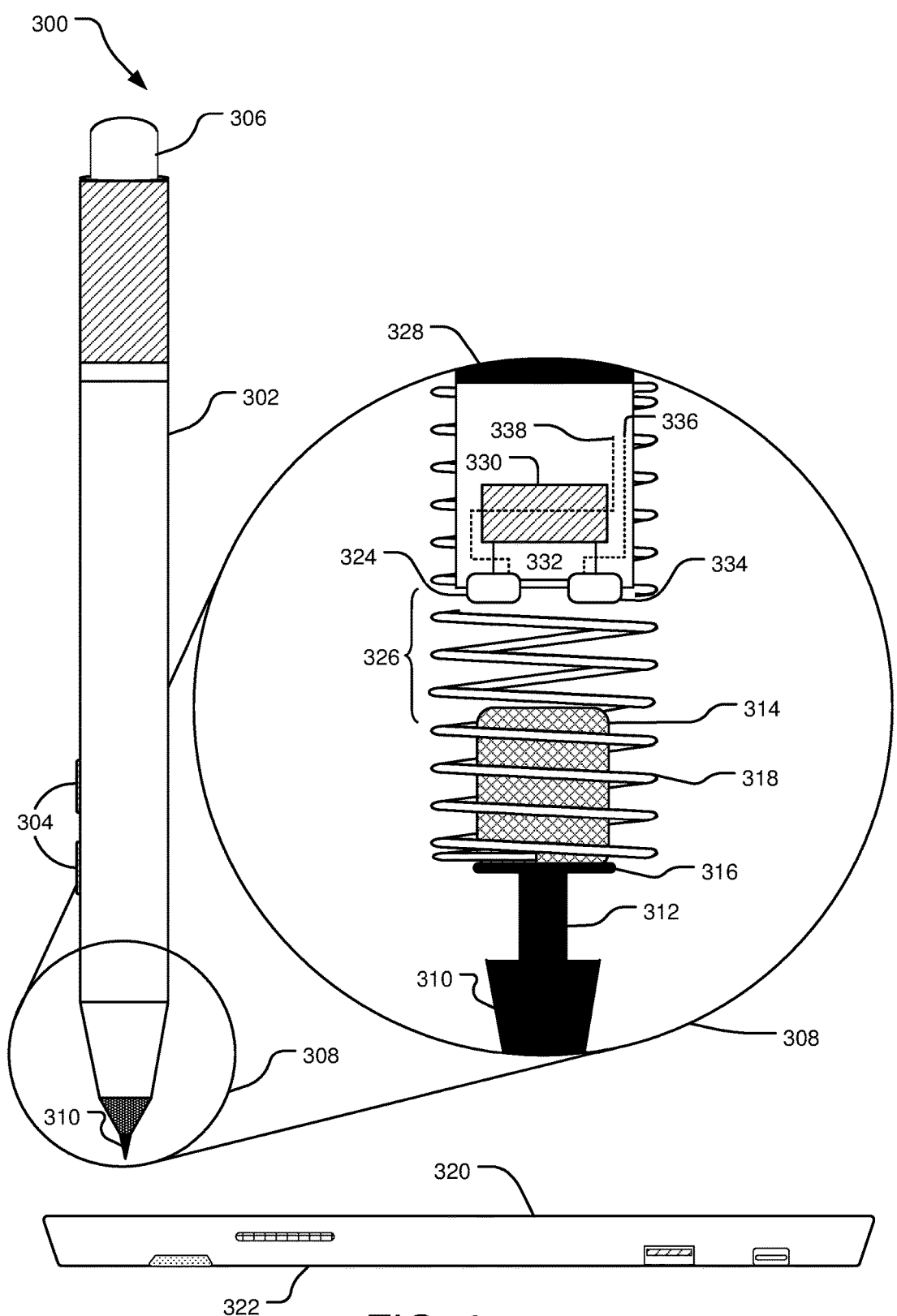
FIG. 3 illustrates another example stylus with a resistive sensor in a hover position.

FIG. 3 illustrates an example stylus 300 in a hover mode. The stylus 300 includes a stylus body 302. In an implementation, the stylus body 302 may be formed of a material suitable for enclosing the components described herein. The stylus body 302 may be formed from, for example without limitation, plastic, rubber, metal, carbon fiber, etc., and/or any combinations thereof. In an implementation, the stylus 300 may include one or more physical buttons 304 selectable by a user. Selection of one of the physical buttons 304 may cause a user input to be transmitted to the stylus 300. For example, without limitation, selection of a physical button 304 may select an application program executing on an electronic device with which the stylus communicates according to a wired or wireless communication protocol. Physical buttons 304 may wake the pen from standby mode and/or activate menus and/or other user interface designs on an application executing on an electronic device. In another implementation, physical buttons 304 may select or "click" an element on a graphical user interface on the electronic device via a cursor. In other implementations, the stylus 300 may include a cap button 306. The cap button 306 may be a physical button selectable by the user, and may perform any of the aforementioned functions mentioned with respect to buttons 304. The stylus 300 may include one or more friction areas for facilitating the user's grip and manipulation, such as, for example, a rubber friction area or textured area to increase friction with a user's hand and/or fingers. In an implementation, the stylus 300 includes a tip 310. The tip 310 may be positioned at the distal end of the stylus 300 on the opposite end of the stylus from the physical button 306.

In FIG. 3, components housed inside stylus body 302 are shown in greater detail in bubble 308. Other components in addition to those shown in bubble 308 may be present inside stylus body 302, including without limitation inside stylus body 302 at the distal end near the tip in the area depicted by bubble 308. In an implementation, a tip 310 extends beyond the distal end of the stylus body 302, and is mechanically coupled to a tip holder shaft 312. The tip holder shaft 312 may be vertically disposed inside stylus housing 302. The tip holder shaft 312 and tip 310 may be slidably coupled to the interior of stylus housing 302. When a user applies pressure to tip 310, such as, for example, by pressing the stylus 300 onto the surface 320 of an associated electronic device 322, the tip 310 and tip holder shaft 312 may slide in concert inside stylus body 302. The tip holder shaft 312 may be mechanically coupled to a support member 316. The support member 316 may support a conductive pad 314. The conductive pad 314 may be formed from a variety of conductive materials. In an implementation, the conductive pad 314 is formed from a deformable conductive material, including without limitation silicon, paraffin wax, etc. In another implementation, the conductive pad 314 may be formed from a non-conductive deformable material such as rubber, and coated with a conductive material. In yet another implementation, the conductive pad 314 may be formed from a material having electrical properties that depend on the magnitude of an applied force, such as silicone contaminate with carbon particles or piezo resistive particles.

The support member 316 may be connected to a spring 318 extending between the support member 316 and a central shaft 324. The spring 318 may be disposed inside the stylus body 302, such that the spring 318 will compress axially when a force is applied via tip 310 and tip holder shaft 312. In one implementation, the spring 318 is a pre-loaded spring. The spring 318 may be pre-loaded to a desired amount according to a number of methods. For example, the spring 318 may be pre-loaded using pre-load spacers added to one or both ends of spring 318, or by using threaded pre-load assemblies, etc. Increasing the amount of pre-loading on spring 318 will increase the force that must be applied to tip holder 312 via tip 310 to move the spring from a pre-loaded position. In one implementation, the pre-load is greater than the weight of the tip 310, the tip holder shaft 312, and any other components slidably connected to the interior of stylus housing 302, such that the tip 310 will remain in a fully extended position when the user holds the stylus 300 in any orientation, such as a vertical orientation. In this implementation, the tip 310 will remain fully extended when the user applies force to the tip 310, such as when the user wishes to provide input to an electronic device by writing on the surface of the device with the stylus 300, until such time that the user applies more force to the tip 310 than the amount of pre-loading on spring 318. When the user applies more force to the tip 310 than the amount of pre-loading on spring 318, the tip holder shaft 312 will begin to compress spring 318.

When the tip 310 is fully extended from the distal end of the stylus 300, such as, for example, when the spring 318 is a pre-loaded spring and the force on the tip 310 is less that the pre-load of the spring 318, then the conductive pad 314 is physically separated by an air gap 326 from exposed pads 324, 334, which are electrically coupled via electrical connection shown by dotted lines to terminals 336, 338 of a circuit that includes the resistive sensor 330. The resistive sensor 330 which may be disposed below or fixedly connected to the central shaft 328. The resistive sensor 330 may be separated from the exposed pads 324, 334 by a spacer block 332 that may house one or more electrical connections as shown in the dotted lines. When the conductive pad 314 contacts the exposed pads 324, 334, an electrical circuit may be completed. Completion of the electrical circuit provides a precise measurement of the point in time when an applied force on the tip is sufficient to move the conductive pad 314 into contact with the terminals 324, 334. In an implementation, the point in time when an electrical circuit is completed indicates a switch between modes of the stylus 300, such as from a hover mode to an ink mode. As applied force on the tip 310 increases, the conductive pad 314 may press increasingly harder on the exposed pads 324, 334, and that force may be transmitted to deform the resistive sensor 330. The increased applied force may be measured as a change in resistance in the circuit due to the pressure on resistive sensor 330. Changing resistance may be measured in the completed circuit at terminals 336, 338, which are disposed at the end of the conductive lines shown by the dotted lines.

The accuracy of the measurement of the point in time when the conductive pad 314 contacts the exposed pads 324, 334, and subsequent measurements of the force applied to the tip due to a change in resistance or current, is independent of the environmental temperature of the stylus 300 because the resistive sensor 330 may be dynamically calibrated at the point of contact to compensate for any thermal drift. In other words, the measured resistance (or current) at the resistive sensor 330 may resemble a step-function wherein the measured resistance (or current) remains at zero or near zero while the circuit is broken, then steps up to a measured level when the circuit has been completed. The magnitude of the step-up is not relevant to the measurement of force applied to the tip 310 because the sensor need only measure the increase in resistance (or current) after the step-up. Any thermal drift experienced by the resistive sensor 330 may be cancelled at the point of contact because the sensor may be effectively "zeroed out" to the magnitude of the resistance measured when the circuit is completed. To accurately measure increasing force on the tip 310, it is only necessary to measure the change in resistance (or current) at the resistive sensor 330 after the circuit has been completed, independent of the magnitude of the measured resistance.

Figure 4:
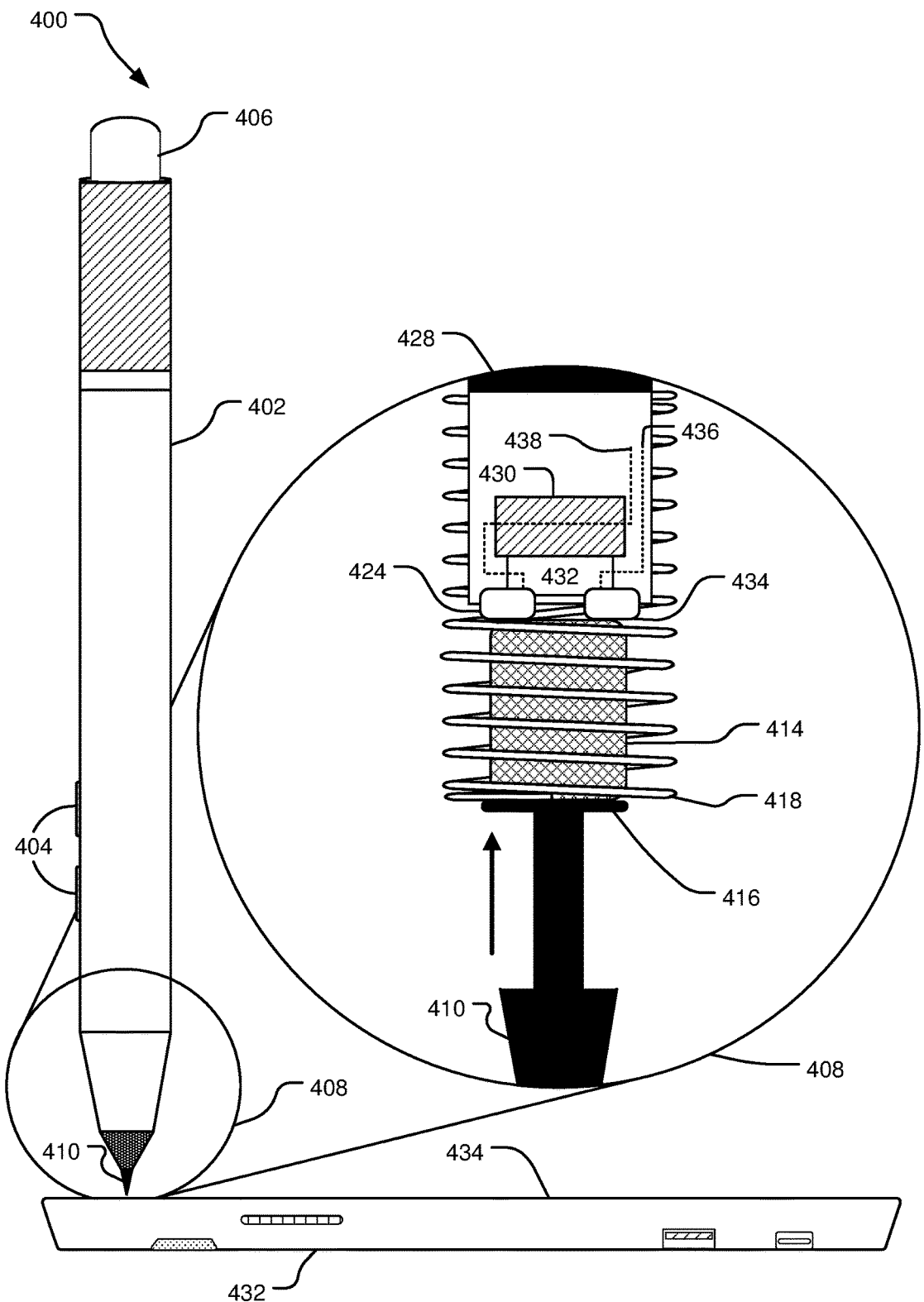
FIG. 4 illustrates another example stylus with a resistive sensor in an ink position.

FIG. 4 illustrates another example stylus 400 in an ink mode. The stylus 400 includes a stylus body 402. The stylus body 402 may be formed of a material suitable for enclosing the components described herein. The stylus body 402 may be formed from, for example without limitation, plastic, rubber, metal, carbon fiber, etc., and/or any combinations thereof. In an implementation, the stylus 400 may include one or more physical buttons 404 selectable by a user. Selection of one of the physical buttons 404 may cause a user input to be transmitted to the stylus 400. For example, without limitation, selection of a physical button 404 may select an application program executing on an electronic device with which the stylus communicates according to a wired or wireless communication protocol. Physical buttons 404 may wake the pen from standby mode and/or activate menus and/or other user interface designs on an application executing on an electronic device. In another implementation, physical buttons 404 may select or "click" an element on a graphical user interface on the electronic device via a cursor. In other implementations, the stylus 400 may include a cap button 406. The cap button 406 may be a physical button selectable by the user, and may perform any of the aforementioned functions mentioned with respect to buttons 404. The stylus 400 may include one or more friction areas for facilitating the user's grip and manipulation, such as, for example, a rubber friction area or textured area to increase friction with a user's hand and/or fingers. In an implementation, the stylus 400 includes a tip 410. The tip 410 may be positioned at the distal end of the stylus 400 on the opposite end of the stylus from the physical button 406.

In FIG. 4, components housed inside stylus body 402 are shown in greater detail in bubble 408. Other components in addition to those shown in bubble 408 may be present inside stylus body 402, including without limitation inside stylus body 402 at the distal end near the tip in the area depicted by bubble 408. In an implementation, top 410 is mechanically coupled to a tip holder shaft 412 vertically disposed inside stylus housing 402. The tip holder shaft 412 and tip 410 may be slidably coupled to the interior of stylus housing 402. When a user applies pressure to tip 410, such as, for example, by pressing the stylus 400 onto the surface 430 of an associated electronic device 432, the tip 410 and tip holder shaft 412 may slide in concert inside stylus body 402. The tip holder shaft 412 may be mechanically coupled to a support member 416. The support member 416 may support a conductive pad 414. The conductive pad 414 may be formed from a variety of conductive materials. In an implementation, the conductive pad 414 is formed from a deformable conductive material, including without limitation silicon, paraffin wax, etc. In another implementation, the conductive pad 414 may be formed from a non-conductive deformable material such as rubber, and coated with a conductive material. In yet another implementation, the conductive pad 414 may be formed from a material having electrical properties that depend on the magnitude of an applied force, such as silicone contaminate with carbon particles or piezo resistive particles.

The support member 416 may be connected to a spring 418 extending between the support member 416 and a central shaft 424. The spring 416 may be disposed inside the stylus body 402, such that the spring 416 will compress axially when a force is applied via tip 410 and tip holder shaft 412. In one implementation, the spring 418 is a pre-loaded spring. The spring 418 may be pre-loaded to a desired amount according to a number of methods. For example, the spring 418 may be pre-loaded using pre-load spacers added to one or both ends of spring 418, or by using threaded pre-load assemblies, etc. Increasing the amount of pre-loading on spring 418 will increase the force that must be applied to tip holder 412 via tip 410 to move the spring from a pre-loaded position. In one implementation, the pre-load is greater than the weight of the tip 410, the tip holder shaft 412, and any other components slidably connected to the interior of stylus housing 402, such that the tip 410 will remain in a fully extended position when the user holds the stylus 400 in any orientation, such as a vertical orientation. In this implementation, the tip 410 will remain fully extended when the user applies force to the tip 410, such as when the user wishes to provide input to an electronic device by writing on the surface of the device with the stylus 400, until such time that the user applies more force to the tip 410 than the amount of pre-loading on spring 418. When the user applies more force to the tip 410 than the amount of pre-loading on spring 418, the tip holder shaft 412 will begin to compress spring 418.

Exposed pads 424, 434 are electrically coupled to terminals 436, 438 of a resistive sensor 430. The resistive sensor 430 may be disposed below or fixedly connected to the central shaft 428. When the conductive pad 414 contacts the exposed pads 424, 434, an electrical circuit may be completed. Completion of the electrical circuit provides a precise measurement of the point in time when an applied force on the tip is sufficient to move the conductive pad 414 into contact with the exposed pads 424, 434. In an implementation, the point in time when an electrical circuit is completed indicates a switch between modes of the stylus 400, such as from a hover mode to an ink mode. As applied force on the tip 410 increases, the conductive pad 414 may press increasingly harder on the exposed pads 424, 434. The increased applied force may be measured as a change in resistance in the circuit due to the pressure on resistive sensor 430. A change in resistance may be measured in the completed circuit at terminals 436, 438, which are located at the end of the conductive lines indicated by dotted lines.

The accuracy of the measurement of the point in time when the conductive pad 414 contacts the exposed pads 424, 434, and subsequent measurements of the force applied to the tip due to a change in resistance or current, is independent of the environmental temperature of the stylus 400 because the resistive sensor 430 may be dynamically calibrated at the point of contact to compensate for any thermal drift. In other words, the measured resistance (or current) at the resistive sensor 430 may resemble a step-function wherein the measured resistance (or current) remains at zero or near zero while the circuit is broken, then steps up to a measured level when the circuit has been completed. The magnitude of the step-up is not relevant to the measurement of force applied to the tip 410 because the sensor need only measure the increase in resistance (or current) after the step-up. Any thermal drift experienced by the resistive sensor 430 may be cancelled at the point of contact because the sensor may be effectively "zeroed out" to the magnitude of the resistance measured when the circuit is completed. To accurately measure increasing force on the tip 410, it is only necessary to measure the change in resistance (or current) at the resistive sensor 430 after the circuit has been completed, independent of the magnitude of the measured resistance.

Figure 5:
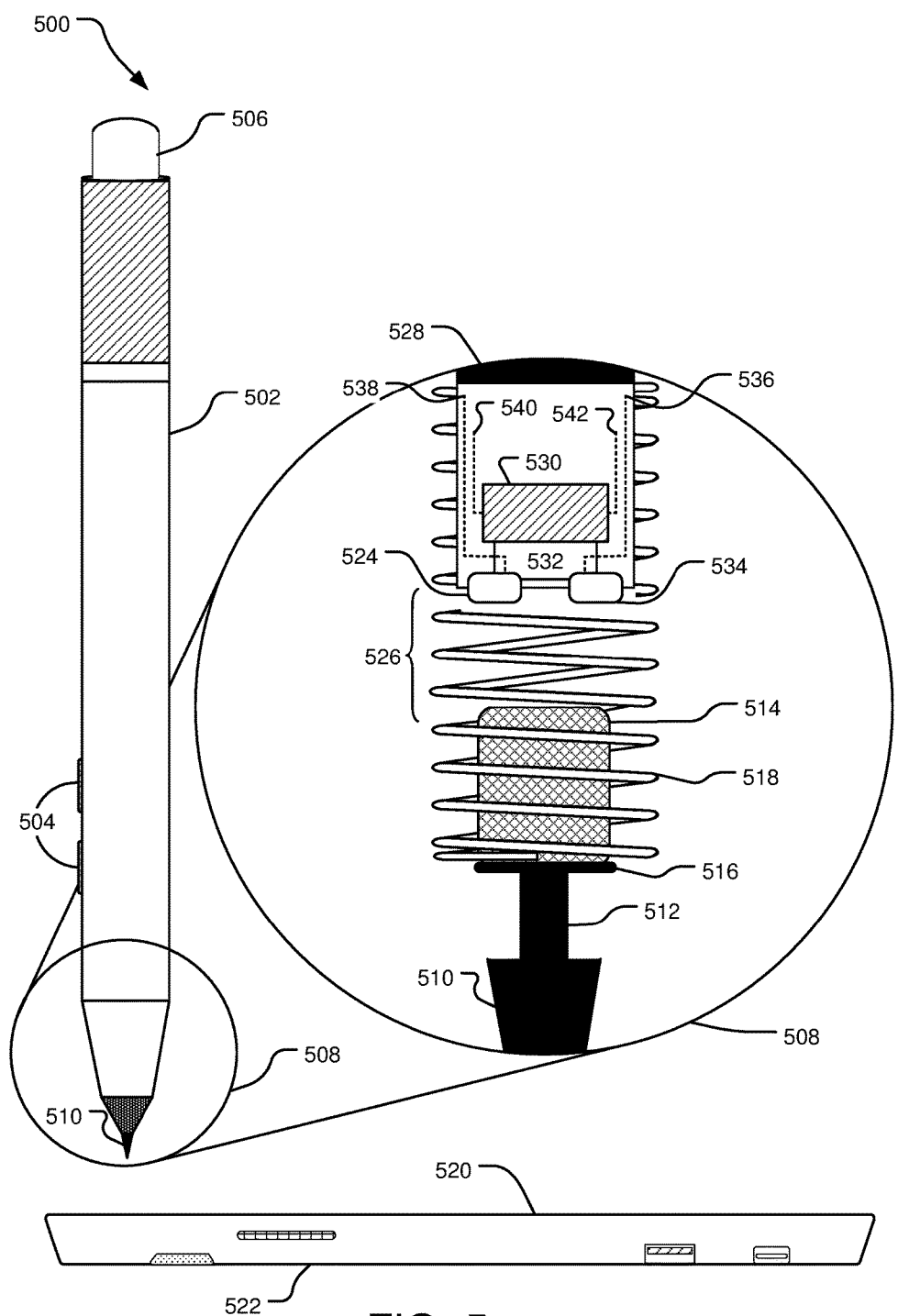
FIG. 5 illustrates another example stylus with a resistive sensor in a hover position.

In FIG. 5, components housed inside stylus body 502 are shown in greater detail in bubble 508. Other components in addition to those shown in bubble 508 may be present inside stylus body 502, including without limitation inside stylus body 502 at the distal end near the tip in the area depicted by bubble 508. In an implementation, a tip 510 extends beyond the distal end of the stylus body 502, and is mechanically coupled to a tip holder shaft 512. The tip holder shaft 512 may be vertically disposed inside stylus housing 502. The tip holder shaft 512 and tip 510 may be slidably coupled to the interior of stylus housing 502. When a user applies pressure to tip 510, such as, for example, by pressing the stylus 500 onto the surface 520 of an associated electronic device 522, the tip 510 and tip holder shaft 512 may slide in concert inside stylus body 502. The tip holder shaft 512 may be mechanically coupled to a support member 516. The support member 516 may support a conductive pad 514. The conductive pad 514 may be formed from a variety of conductive materials. In an implementation, the conductive pad 514 is formed from a deformable conductive material, including without limitation silicon, paraffin wax, etc. In another implementation, the conductive pad 514 may be formed from a non-conductive deformable material such as rubber, and coated with a conductive material. In yet another implementation, the conductive pad 514 may be formed from a material having electrical properties that depend on the magnitude of an applied force, such as silicone contaminate with carbon particles or piezo resistive particles.

The support member 516 may be connected to a spring 518 extending between the support member 516 and a central shaft 524. The spring 518 may be disposed inside the stylus body 502, such that the spring 518 will compress axially when a force is applied via tip 510 and tip holder shaft 512. In one implementation, the spring 518 is a pre-loaded spring. The spring 518 may be pre-loaded to a desired amount according to a number of methods. For example, the spring 518 may be pre-loaded using pre-load spacers added to one or both ends of spring 518, or by using threaded pre-load assemblies, etc. Increasing the amount of pre-loading on spring 518 will increase the force that must be applied to tip holder 512 via tip 510 to move the spring from a pre-loaded position. In one implementation, the pre-load is greater than the weight of the tip 510, the tip holder shaft 512, and any other components slidably connected to the interior of stylus housing 502, such that the tip 510 will remain in a fully extended position when the user holds the stylus 500 in any orientation, such as a vertical orientation. In this implementation, the tip 510 will remain fully extended when the user applies force to the tip 510, such as when the user wishes to provide input to an electronic device by writing on the surface of the device with the stylus 500, until such time that the user applies more force to the tip 510 than the amount of pre-loading on spring 518. When the user applies more force to the tip 510 than the amount of pre-loading on spring 518, the tip holder shaft 512 will begin to compress spring 518.

When the tip 510 is fully extended from the distal end of the stylus 500, such as, for example, when the spring 518 is a pre-loaded spring and the force on the tip 510 is less that the pre-load of the spring 518, then the conductive pad 514 is physically separated by an air gap 526 from exposed pads 524, 534, which are electrically coupled via electrical connection shown by dotted lines to terminals 536, 538 of a circuit. The resistive sensor 530 may be disposed below or fixedly connected to the central shaft 528. The resistive sensor 530 may be separated from the exposed pads 524, 534 by a spacer block 532 that may house one or more electrical connections as shown in the dotted lines. The resistive sensor 530 may contain electrical lines in a distinct circuit and including terminals 540, 542. Spacer block 532 may also contain electrical lines in a distinct circuit including terminals 536, 538.

When the conductive pad 514 contacts the exposed pads 524, 534, an electrical circuit may be completed in the circuit including the terminals 536, 538. Completion of this electrical circuit provides a precise measurement of the point in time when an applied force on the tip is sufficient to move the conductive pad 514 into contact with the terminals 524, 534. In an implementation, the point in time when an electrical circuit is completed indicates a switch between modes of the stylus 500, such as from a hover mode to an ink mode.

As applied force on the tip 510 increases, the conductive pad 514 may press increasingly harder on the exposed pads 524, 534. The increased applied force may be measured as a change in resistance in the circuit due to the pressure on resistive sensor 530. In an implementation, exposed pads 524, 534 may be located on a printed circuit board (PCB) or on a flex circuit that may transmit an applied force to resistive sensor 530. A change in resistance may be measured in the circuit including terminals 540, 542, which is a distinct circuit from the circuit including exposed pads 524, 534. In other words, the circuit including exposed pads 524, 534 may operate as a switch function to precisely detect the moment that the conductive pad 514 makes contact, and the circuit including the resistive sensor 530 and terminals 540, 542 may be used to measure the change in electrical resistance after the initial point of contact. In all implementations described herein, precisely detecting the moment that the conductive pad 514 makes contact may be accomplished with one or more MEMS sensors to complete the electrical circuit.

The accuracy of the measurement of the point in time when the conductive pad 514 contacts the exposed pads 524, 534, and subsequent measurements of the force applied to the tip due to a change in resistance or current, is independent of the environmental temperature of the stylus 500 because the resistive sensor 530 may be dynamically calibrated at the point of contact, or before the point of contact, to compensate for any thermal drift. In other words, the measured resistance (or current) at the resistive sensor 530 may resemble a step-function wherein the measured resistance (or current) remains at zero or near zero while the circuit is broken, then steps up to a measured level when the circuit has been completed. The magnitude of the step-up is not relevant to the measurement of force applied to the tip 510 because the sensor need only measure the increase in resistance (or current) after the step-up. Any thermal drift experienced by the resistive sensor 530 may be cancelled at the point of contact because the sensor may be effectively "zeroed out" to the magnitude of the resistance measured when the circuit is completed. To accurately measure increasing force on the tip 510, it is only necessary to measure the change in resistance (or current) at the resistive sensor 530 after the circuit has been completed, independent of the magnitude of the measured resistance.

Figure 6:
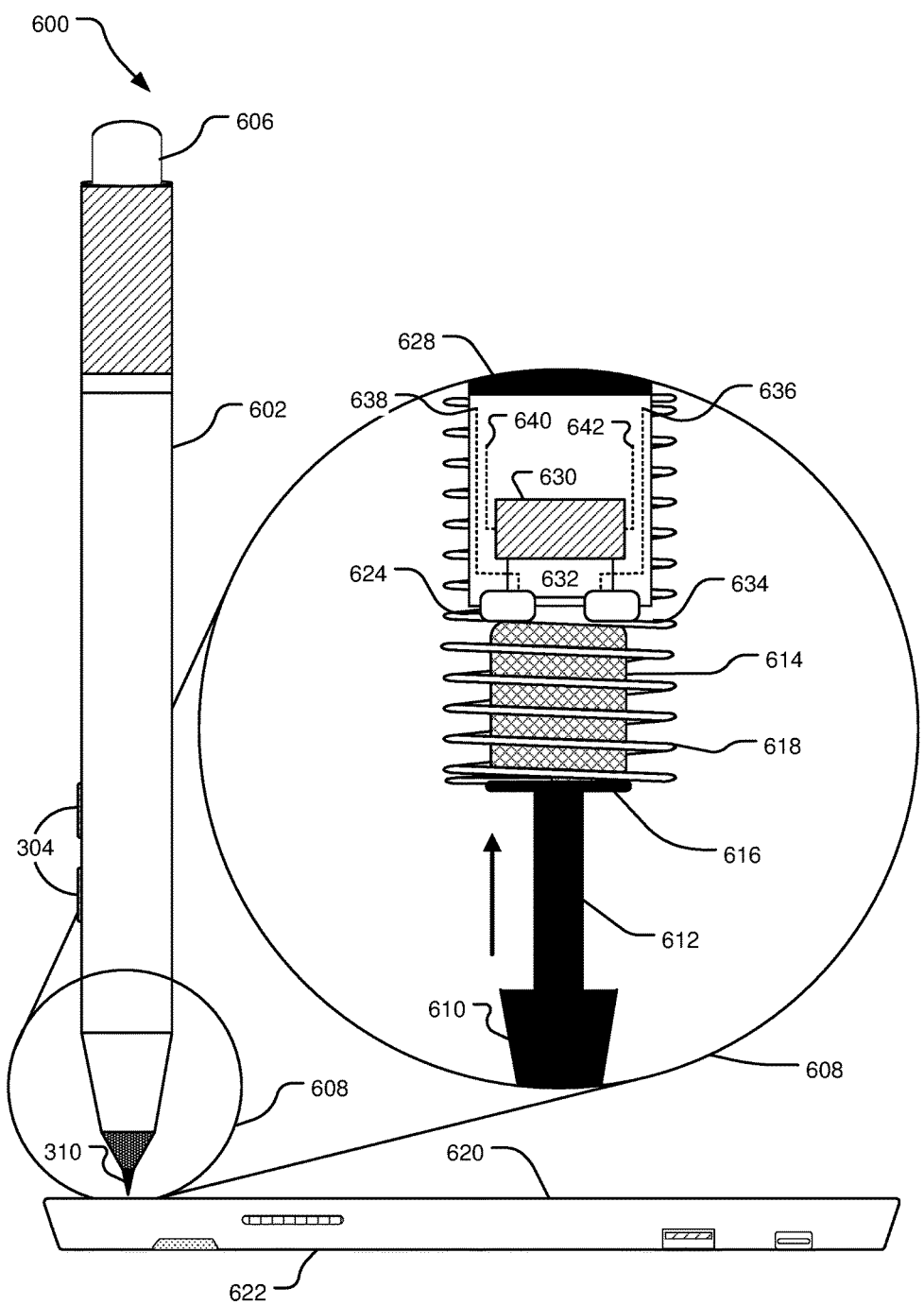
FIG. 6 illustrates another example stylus with a resistive sensor in an ink position.

FIG. 6 illustrates another example stylus 600 in an ink mode. The stylus 600 includes a stylus body 602. The stylus body 602 may be formed of a material suitable for enclosing the components described herein. The stylus body 602 may be formed from, for example without limitation, plastic, rubber, metal, carbon fiber, etc., and/or any combinations thereof. In an implementation, the stylus 600 may include one or more physical buttons 604 selectable by a user. Selection of one of the physical buttons 604 may cause a user input to be transmitted to the stylus 600. For example, without limitation, selection of a physical button 604 may select an application program executing on an electronic device with which the stylus communicates according to a wired or wireless communication protocol. Physical buttons 604 may wake the pen from standby mode and/or activate menus and/or other user interface designs on an application executing on an electronic device. In another implementation, physical buttons 604 may select or "click" an element on a graphical user interface on the electronic device via a cursor. In other implementations, the stylus 600 may include a cap button 606. The cap button 606 may be a physical button selectable by the user, and may perform any of the aforementioned functions mentioned with respect to buttons 604. The stylus 600 may include one or more friction areas for facilitating the user's grip and manipulation, such as, for example, a rubber friction area or textured area to increase friction with a user's hand and/or fingers. In an implementation, the stylus 600 includes a tip 610. The tip 610 may be positioned at the distal end of the stylus 600 on the opposite end of the stylus from the physical button 606.

In FIG. 6, components housed inside stylus body 602 are shown in greater detail in bubble 608. Other components in addition to those shown in bubble 608 may be present inside stylus body 602, including without limitation inside stylus body 602 at the distal end near the tip in the area depicted by bubble 608. In an implementation, top 610 is mechanically coupled to a tip holder shaft 612 vertically disposed inside stylus housing 602. The tip holder shaft 612 and tip 610 may be slidably coupled to the interior of stylus housing 602. When a user applies pressure to tip 610, such as, for example, by pressing the stylus 600 onto the surface 630 of an associated electronic device 632, the tip 610 and tip holder shaft 612 may slide in concert inside stylus body 602. The tip holder shaft 612 may be mechanically coupled to a support member 616. The support member 616 may support a conductive pad 614. The conductive pad 614 may be formed from a variety of conductive materials. In an implementation, the conductive pad 614 is formed from a deformable conductive material, including without limitation silicon, paraffin wax, etc. In another implementation, the conductive pad 614 may be formed from a non-conductive deformable material such as rubber, and coated with a conductive material. In yet another implementation, the conductive pad 614 may be formed from a material having electrical properties that depend on the magnitude of an applied force, such as silicone contaminate with carbon particles or piezo resistive particles.

The support member 616 may be connected to a spring 618 extending between the support member 616 and a central shaft 624. The spring 616 may be disposed inside the stylus body 602, such that the spring 616 will compress axially when a force is applied via tip 610 and tip holder shaft 612. In one implementation, the spring 618 is a pre-loaded spring. The spring 618 may be pre-loaded to a desired amount according to a number of methods. For example, the spring 618 may be pre-loaded using pre-load spacers added to one or both ends of spring 618, or by using threaded pre-load assemblies, etc. Increasing the amount of pre-loading on spring 618 will increase the force that must be applied to tip holder 612 via tip 610 to move the spring from a pre-loaded position. In one implementation, the pre-load is greater than the weight of the tip 610, the tip holder shaft 612, and any other components slidably connected to the interior of stylus housing 602, such that the tip 610 will remain in a fully extended position when the user holds the stylus 600 in any orientation, such as a vertical orientation. In this implementation, the tip 610 will remain fully extended when the user applies force to the tip 610, such as when the user wishes to provide input to an electronic device by writing on the surface of the device with the stylus 600, until such time that the user applies more force to the tip 610 than the amount of pre-loading on spring 618. When the user applies more force to the tip 610 than the amount of pre-loading on spring 618, the tip holder shaft 612 will begin to compress spring 618.

Exposed pads 624, 634 are electrically coupled via electrical connection shown by dotted lines to terminals 636, 638 of a circuit. The resistive sensor 630 may be disposed below or fixedly connected to the central shaft 628. The resistive sensor 630 may be separated from the exposed pads 624, 634 by a spacer block 632 that may house one or more electrical connections as shown in the dotted lines. The resistive sensor 630 may contain electrical lines in a distinct circuit and including terminals 640, 642. Spacer block 632 may also contain electrical lines in a distinct circuit including terminals 636, 638.

When the conductive pad 614 contacts the exposed pads 624, 634, an electrical circuit may be completed in the circuit including the terminals 636, 638. Completion of this electrical circuit provides a precise measurement of the point in time when an applied force on the tip is sufficient to move the conductive pad 614 into contact with the terminals 624, 634. In an implementation, the point in time when an electrical circuit is completed indicates a switch between modes of the stylus 600, such as from a hover mode to an ink mode.

As applied force on the tip 610 increases, the conductive pad 614 may press increasingly harder on the exposed pads 624, 634. The increased applied force may be measured as a change in resistance in the circuit due to the pressure on resistive sensor 630. A change in resistance may be measured in the circuit including terminals 640, 642, which is a distinct circuit from the circuit including exposed pads 624, 634. In other words, the circuit including exposed pads 624, 634 may operate as a switch function to precisely detect the moment that the conductive pad 614 makes contact, and the circuit including the resistive sensor 630 and terminals 640, 642 may be used to measure the change in electrical resistance after the initial point of contact.

The accuracy of the measurement of the point in time when the conductive pad 614 contacts the exposed pads 624, 634, and subsequent measurements of the force applied to the tip due to a change in resistance or current, is independent of the environmental temperature of the stylus 600 because the resistive sensor 630 may be dynamically calibrated at the point of contact to compensate for any thermal drift. In other words, the measured resistance (or current) at the resistive sensor 630 may resemble a step-function wherein the measured resistance (or current) remains at zero or near zero while the circuit is broken, then steps up to a measured level when the circuit has been completed. The magnitude of the step-up is not relevant to the measurement of force applied to the tip 610 because the sensor need only measure the increase in resistance (or current) after the step-up. Any thermal drift experienced by the resistive sensor 630 may be cancelled at the point of contact because the sensor may be effectively "zeroed out" to the magnitude of the resistance measured when the circuit is completed. In other words, the resistive sensor 630 may be set to report a zero value at the point in time when the circuit has been completed. To accurately measure increasing force on the tip 610, it is only necessary to measure the change in resistance (or current) at the resistive sensor 630 after the circuit has been completed, independent of the magnitude of the measured resistance.

Figure 7:
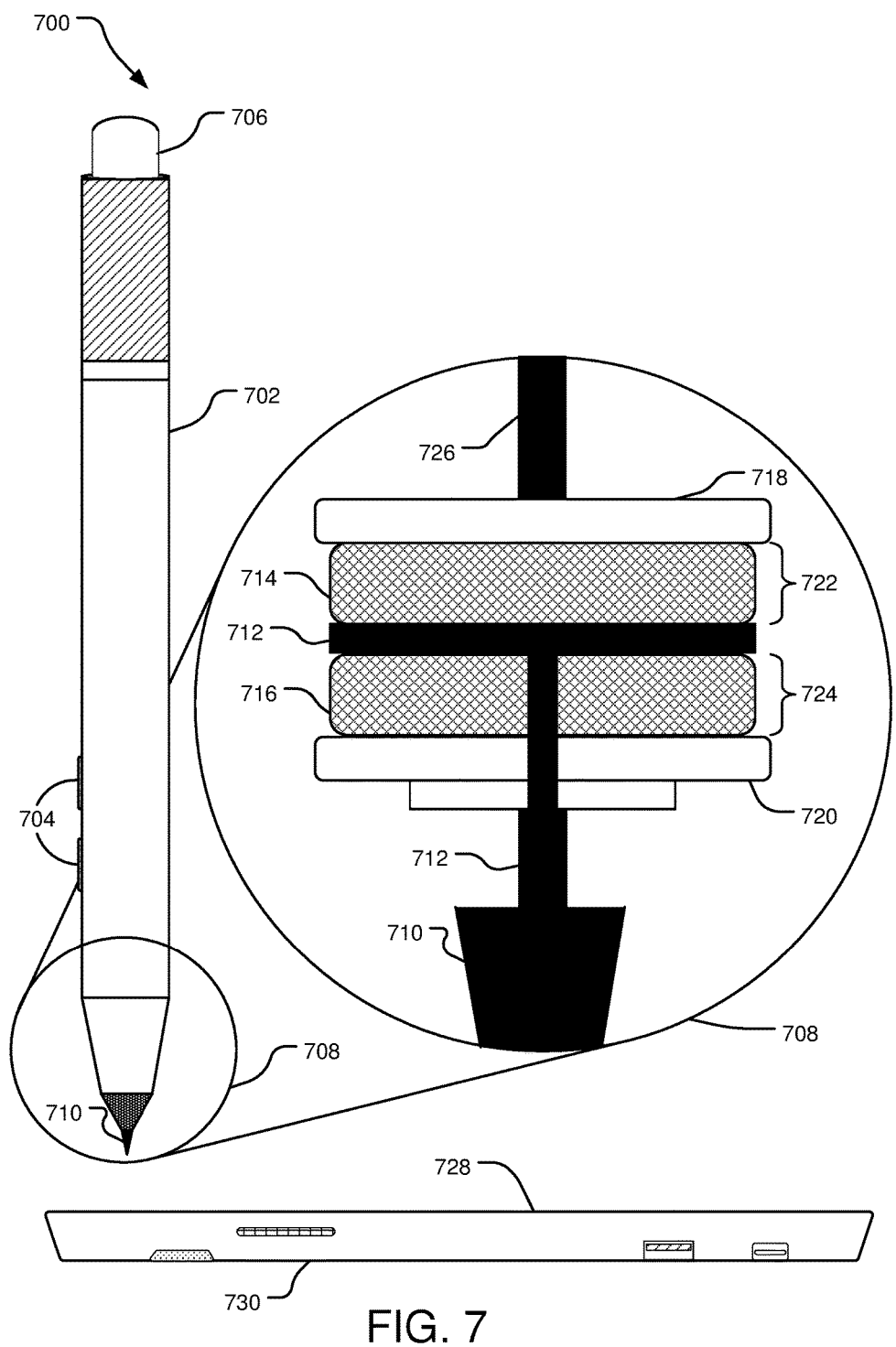
FIG. 7 illustrates another example stylus with differential resistive sensors.

FIG. 7 illustrates another example stylus 700 in a hover mode. The stylus 700 includes a stylus body 702. In an implementation, the stylus body 702 may be formed of a material suitable for enclosing the components described herein. The stylus body 702 may be formed from, for example without limitation, plastic, rubber, metal, carbon fiber, etc., and/or any combinations thereof. In an implementation, the stylus 700 may include one or more physical buttons 704 selectable by a user. Selection of one of the physical buttons 704 may cause a user input to be transmitted to the stylus 700. For example, without limitation, selection of a physical button 704 may select an application program executing on an electronic device with which the stylus communicates according to a wired or wireless communication protocol. Physical buttons 704 may wake the pen from standby mode and/or activate menus and/or other user interface designs on an application executing on an electronic device. In another implementation, physical buttons 704 may select or "click" an element on a graphical user interface on the electronic device via a cursor. In other implementations, the stylus 100 may include a cap button 706. The cap button 706 may be a physical button selectable by the user, and may perform any of the aforementioned functions mentioned with respect to buttons 704. The stylus 700 may include one or more friction areas for facilitating the user's grip and manipulation, such as, for example, a rubber friction area or textured area to increase friction with a user's hand and/or fingers. In an implementation, the stylus 700 includes a tip 710. The tip 710 may be positioned at the distal end of the stylus 700 on the opposite end of the stylus from the physical button 706.

In FIG. 7, the components housed inside stylus body 702 are shown in greater detail in bubble 708. Other components in addition to those shown in bubble 708 may be present inside stylus body 702, including without limitation inside stylus body 702 at the distal end near the tip in the area depicted by bubble 708. In an implementation, tip 710 is mechanically coupled to a tip holder shaft 712 disposed inside stylus housing 702. The tip holder shaft 712 and tip 710 may be slidably coupled to the interior of stylus housing 702. The tip holder shaft 712 may include a vertical member and a horizontal member. In one implementation, the tip holder shaft 712 may be arranged such that the horizontal member of tip holder shaft 712 is disposed between two elastic pads 714, 716. In other implementations, elastic pads 714, 716 may form a single elastic pad surrounding part or all of the horizontal member of tip holder shaft 712. In an implementation, resistive sensors 718, 720 may be disposed above and below elastic pads 714, 716, respectively. Accordingly, resistive sensors 718, 720 are separated from the horizontal member of tip holder shaft 712 by spaces 722, 724. In an implementation, spaces 722, 724 are approximately equal in length. In another implementation, spaces 722, 724 differ in length. In an implementation, one or more of the components shown in bubble 708 may be fixedly secured to the inside of stylus body 702. In another implementation, central shaft 726 may secure one or more of the components shown in bubble 708 to the inside of stylus body 702.

In one implementation, resistive sensors 718, 720 and elastic pads 714, 716 are disposed such that there is a baseline force exerted on resistive force sensors 718, 720, even when there is no force applied to tip 710, such as when the tip 710 is not in contact with a screen 728 of an associated electronic device 730. The baseline force may be caused because the elastic pads 722, 724 are sized slightly larger than the spaces 722, 724. In other words, the elastic pads 714, 716 must be squeezed to fit in spaces 722, 724, and therefore the tendency of elastic pads 714, 716 to expand to their original size exerts a force on resistive sensors 718, 720. In this implementation, the tip holder shaft 712 may remain substantially in the position shown in FIG. 7 until such time as a force is applied to tip 710. Forces applied to tip 710 may include a force applied by a user pressing stylus 700 against the surface 728 of an associated electronic device 730, the force of gravity applied to the tip 710 and tip holder shaft 712 when the stylus 700 is held upright, forces due to movements of the stylus 700, etc. In another implementation, the tip holder shaft 712 contacts the resistive force sensor 718, 720 directly.

Figure 8:
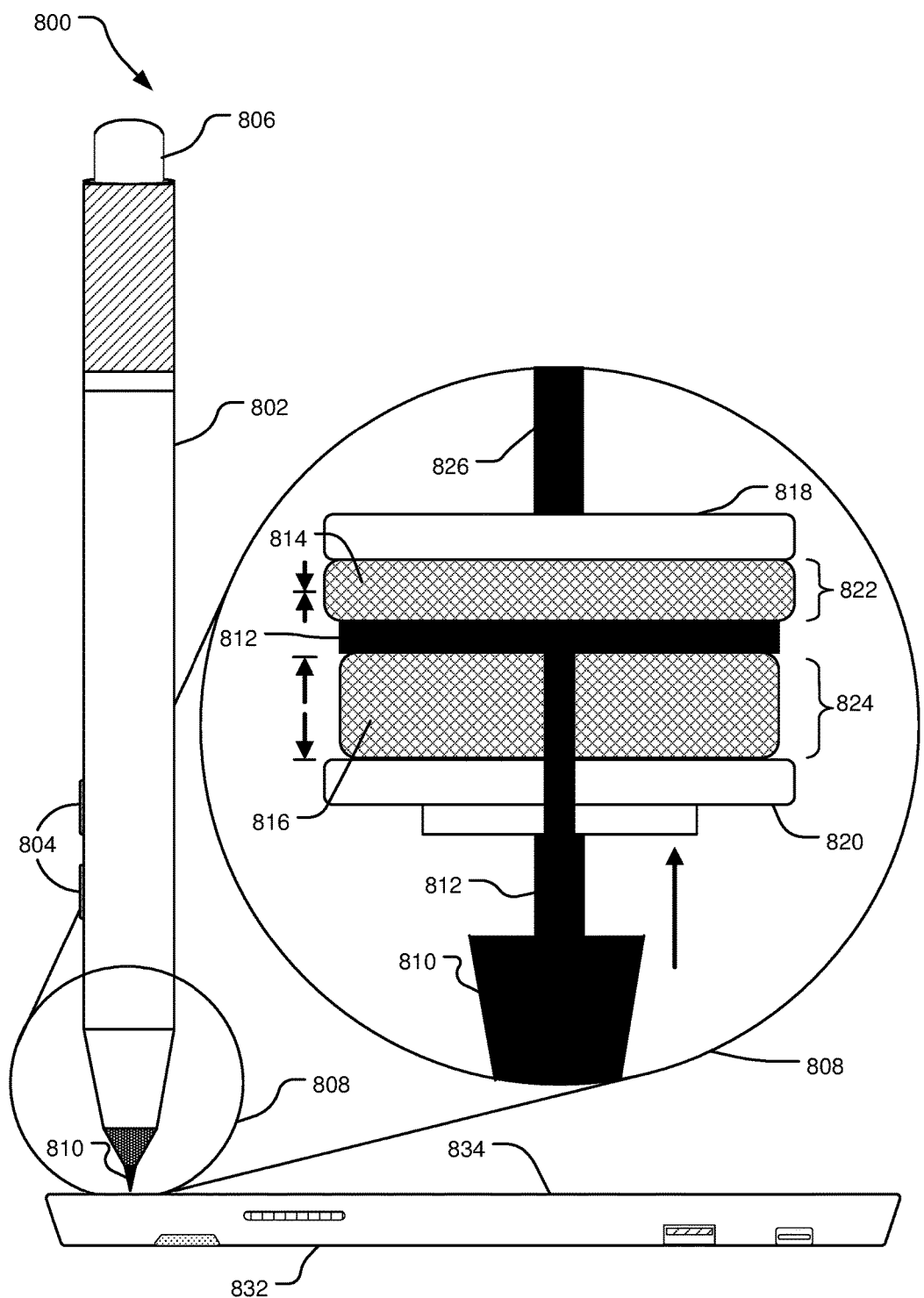
FIG. 8 illustrates another example stylus with differential resistive sensors in an ink position

FIG. 8 illustrates another example stylus 800 in an ink mode. The stylus 800 includes a stylus body 802. In an implementation, the stylus body 802 may be formed of a material suitable for enclosing the components described herein. The stylus body 802 may be formed from, for example without limitation, plastic, rubber, metal, carbon fiber, etc., and/or any combinations thereof. In an implementation, the stylus 800 may include one or more physical buttons 804 selectable by a user. Selection of one of the physical buttons 804 may cause a user input to be transmitted to the stylus 800. For example, without limitation, selection of a physical button 804 may select an application program executing on an electronic device with which the stylus communicates according to a wired or wireless communication protocol. Physical buttons 804 may wake the pen from standby mode and/or activate menus and/or other user interface designs on an application executing on an electronic device. In another implementation, physical buttons 804 may select or "click" an element on a graphical user interface on the electronic device via a cursor. In other implementations, the stylus 800 may include a cap button 806. The cap button 806 may be a physical button selectable by the user, and may perform any of the aforementioned functions mentioned with respect to buttons 804. The stylus 800 may include one or more friction areas for facilitating the user's grip and manipulation, such as, for example, a rubber friction area or textured area to increase friction with a user's hand and/or fingers. In an implementation, the stylus 800 includes a tip 810. The tip 810 may be positioned at the distal end of the stylus 800 on the opposite end of the stylus from the physical button 806.

In FIG. 8, the components housed inside stylus body 802 are shown in greater detail in bubble 808. Other components in addition to those shown in bubble 808 may be present inside stylus body 802, including without limitation inside stylus body 802 at the distal end near the tip in the area depicted by bubble 808. In an implementation, tip 810 is mechanically coupled to a tip holder shaft 812 disposed inside stylus housing 802. The tip holder shaft 812 and tip 810 may be slidably coupled to the interior of stylus housing 802. The tip holder shaft 812 may include a vertical member and a horizontal member. In one implementation, the tip holder shaft 812 may be arranged such that the horizontal member of tip holder shaft 812 is disposed between two elastic pads 814, 816. In other implementations, elastic pads 814, 816 may form a single elastic pad surrounding part or all of the horizontal member of tip holder shaft 812. In an implementation, resistive sensors 818, 820 may be disposed above and below elastic pads 814, 816, respectively. Accordingly, resistive sensors 818, 820 are separated from the horizontal member of tip holder shaft 812 by spaces 822, 824. In an implementation, spaces 822, 824 are approximately equal in length. In another implementation, spaces 822, 824 may differ in length. In an implementation, one or more of the components shown in bubble 818 may be fixedly secured to the inside of stylus body 802. In one implementation, central shaft 826 may secure one or more of the components shown in bubble 818 to the inside of stylus body 802.

As shown in FIG. 8, when a user applies pressure to tip 810, such as, for example, by pressing the stylus 800 onto the surface 834 of an associated electronic device 832, the tip 810 and tip holder shaft 812 may slide in concert inside stylus body 802. Since the horizontal member of tip holder shaft 812 is disposed between elastic pad 814 and resistive sensor 818, the tip holder shaft 812 may press upon elastic pad 814. In an implementation, force applied to tip holder shaft 812 may compress elastic pad 814 and stretch elastic pad 816, such that the space 822 between resistive sensor 818 and the horizontal member of tip holder shaft 812 is reduced, and the space between resistive sensor 820 and the horizontal member of tip holder shaft 812 is correspondingly increased. In one embodiment, a force applied to the elastic pad 814 may cause the elastic pad 814 to squeeze outwardly, and the reduction in force on elastic pad 816 may cause it to stretch to remain in contact with both resistive sensor 820 and the horizontal member of tip holder shaft 812. The resistive sensors 818, 820 may measure a force applied to the tip 810 when the tip applies a differential force to resistive sensors 818, 820. In other words, when a force is applied to tip 810, it may slide inside stylus body 802 and apply a greater force to resistive sensor 818 and a corresponding lesser force to resistive sensor 820. The stylus 800 may measure the force applied by measuring the difference between the force measured at the first resistive sensor 818 and the second resistive sensor 820.

As explained above, resistive sensors may experience thermal drift due to changes in environmental temperature conditions. When the environmental temperature around the stylus 800 changes, it may cause a resistive sensor in the stylus 800 to measure more or less current (or resistance) for a constant applied force than the sensor would have in the absence of environmental temperature changes. If experiencing thermal drift, a stylus with resistive sensors may require a varying amount of force to be applied to the tip to change the stylus from a hover state to an ink state, depending on the environmental temperature. The stylus 800, however, is able to measure the actual force applied to the resistive sensors 818, 820 in a temperature-independent or temperature-immune manner because both sensors 818 and 820 may experience the same thermal drift regardless of the changes in environmental temperature. If the resistance (or current) measured at resistive sensor 818 is greater than the resistance (or current) measured at sensor 820, then the stylus 800 may switch to an ink state. If the resistance (or current) measured at sensor 818 is substantially equal to the resistance (or current) measured at sensor 820, then the stylus 800 may be switched to a hover state. In an implementation, the stylus 800 may compensate for the force of gravity acting on the tip 810, tip holder shaft 812, and any other components that may be slidably connected thereto that may exert a downward force on the sensor 820 when the stylus 800 is held in an upright position to maintain a hover state even though the difference between the resistance (or current) measured at sensors 818, 820 is not strictly zero.

Figure 9:
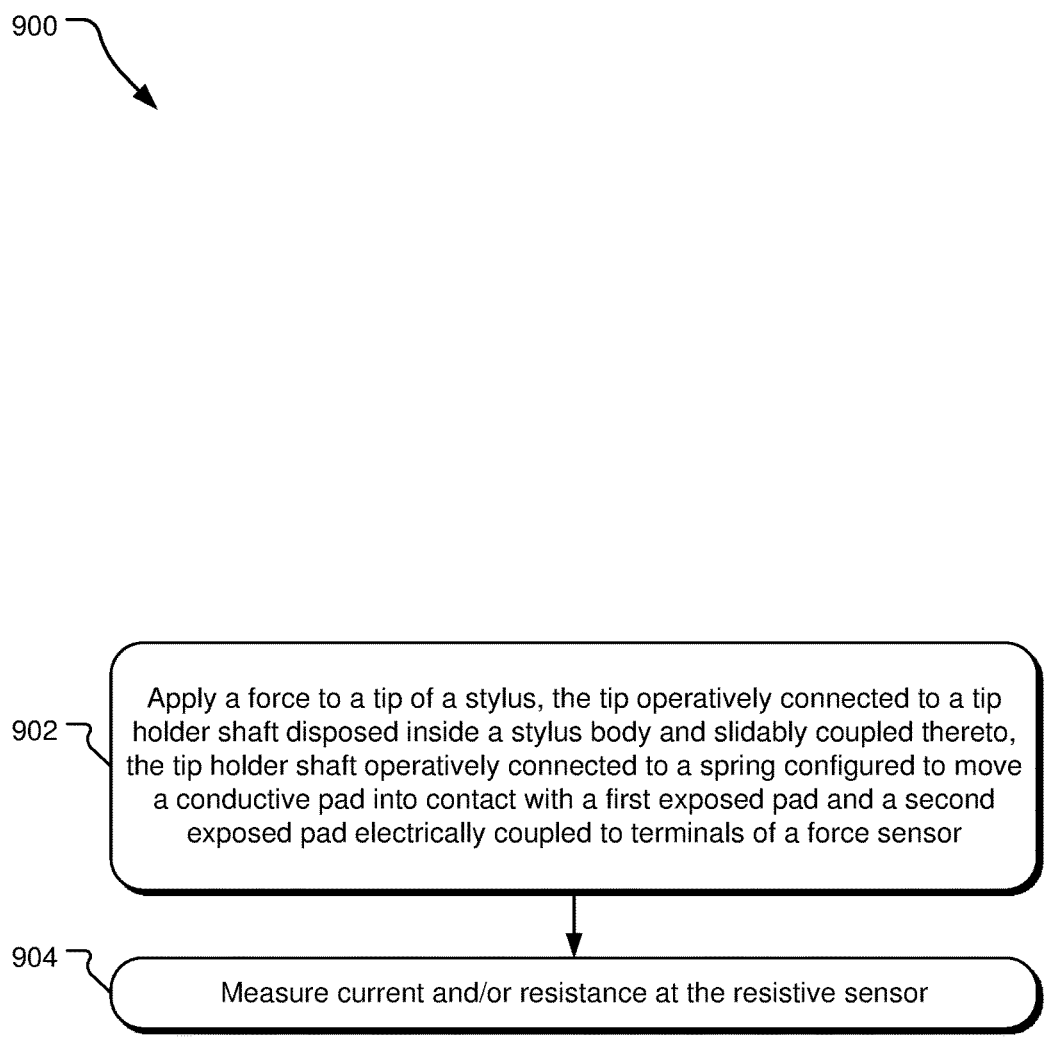
FIG. 9 illustrates example operations for sensing an ink condition in a stylus with a resistive sensor.

FIG. 9 illustrates example operations 900 for precisely detecting contact on the tip of a stylus to activate an ink mode. The example operations 900 may be carried out by software, firmware, hardware, and/or circuitry in an apparatus, such as, for example, in a stylus peripheral device. An applying operation 902 applies a force to the tip of a stylus for use as a peripheral device for transmitting user input to an associated electronic device. The tip may be disposed at the distal end of the stylus. In an implementation, the tip is operatively connected to a tip holder shaft disposed inside the stylus and slidably coupled thereto. The tip holder shaft may be configured to move a conductive pad when compressed into contact with a first exposed pad and a second exposed pad electrically coupled to terminals of a resistive sensor.

A measuring operation 904 measures resistance and/or at the resistive sensor disposed inside the stylus. In an implementation, the stylus may include an on-board battery sufficient to supply a potential difference across the resistive sensors. When a body applies a force to one of the resistive sensors, the stylus may measure that force by measuring a change in current (or resistance) in the resistive sensor.

Figure 10:
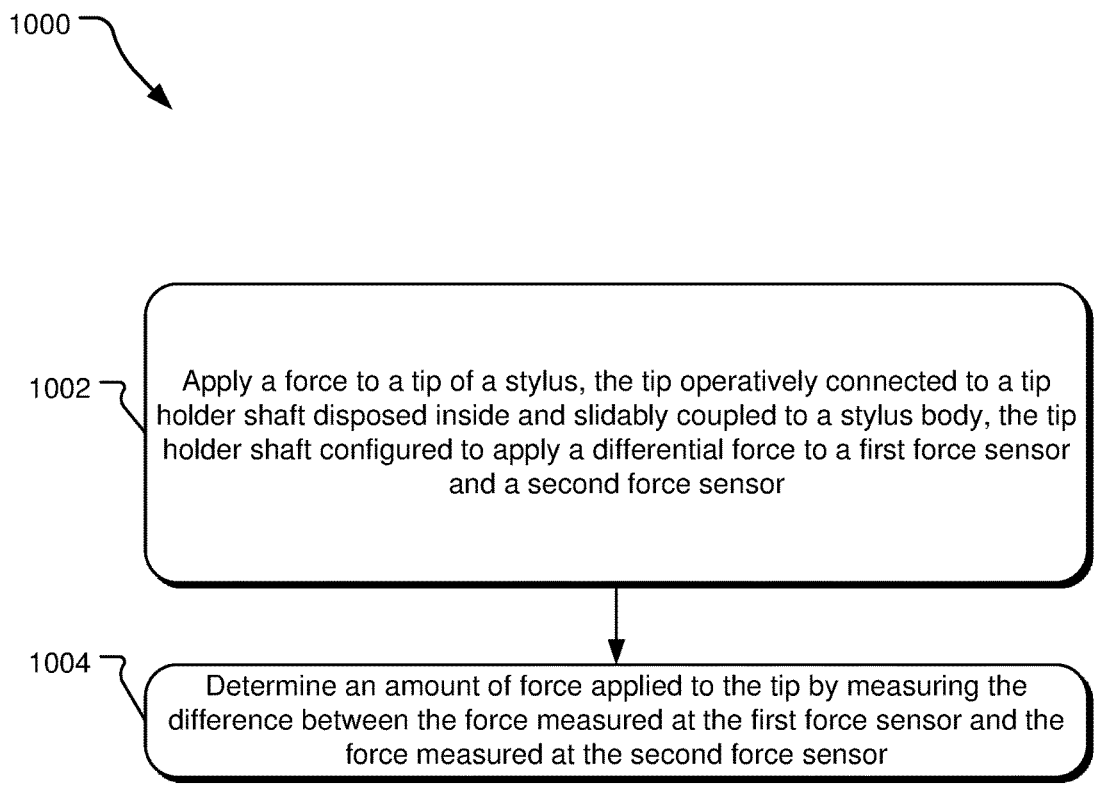
FIG. 10 illustrates other example operations for sensing user pressure on a stylus with differential resistive sensors.

FIG. 10 illustrates example operations for measuring an applied force to a stylus in a temperature-independent manner. The example operations 1000 may be carried out by software, firmware, hardware, and/or circuitry in an apparatus, such as, for example, in a stylus peripheral device. An applying operation 1002 applies a force to the tip of a stylus for use as a peripheral device for transmitting user input to an associated electronic device. The tip may be disposed at the distal end of the stylus. In an implementation, the tip is operatively connected to a tip holder shaft disposed inside the stylus and slidably coupled thereto. The tip holder shaft may be disposed between a first force sensor and a second force sensor and configured to apply a differential force to the first force sensor and the second force sensor when a force is applied to the tip.

A differential force indicates that, as the tip holder shaft moves based on a force applied to the tip, the force measured at the second force sensor may decrease, while the force measured at the first force sensor may increase. In other words, in the hover state, one or both force sensors may measure a force due to a variety of factors including the force exerted by an elastic pad squeezed between the sensors, a force due to thermal drift, etc. When a force is applied to the tip of the stylus, the tip holder shaft may not only transmit that force to the first force sensor, but may also shift force previously applied to the second force sensor to the first force sensor. In an implementation, the tip holder shaft includes a horizontal member disposed between the first conductive pad portion and the second conductive pad portion.

A determining operation 1004 measures an amount of force applied to the tip by measuring the difference between the force measured at the first force sensor and the force measured at the second force sensor. The determining operation 1004 may be temperature-independent because any thermal drift may be experienced by both sensors, effectively cancelling the drift.

Figure 11:
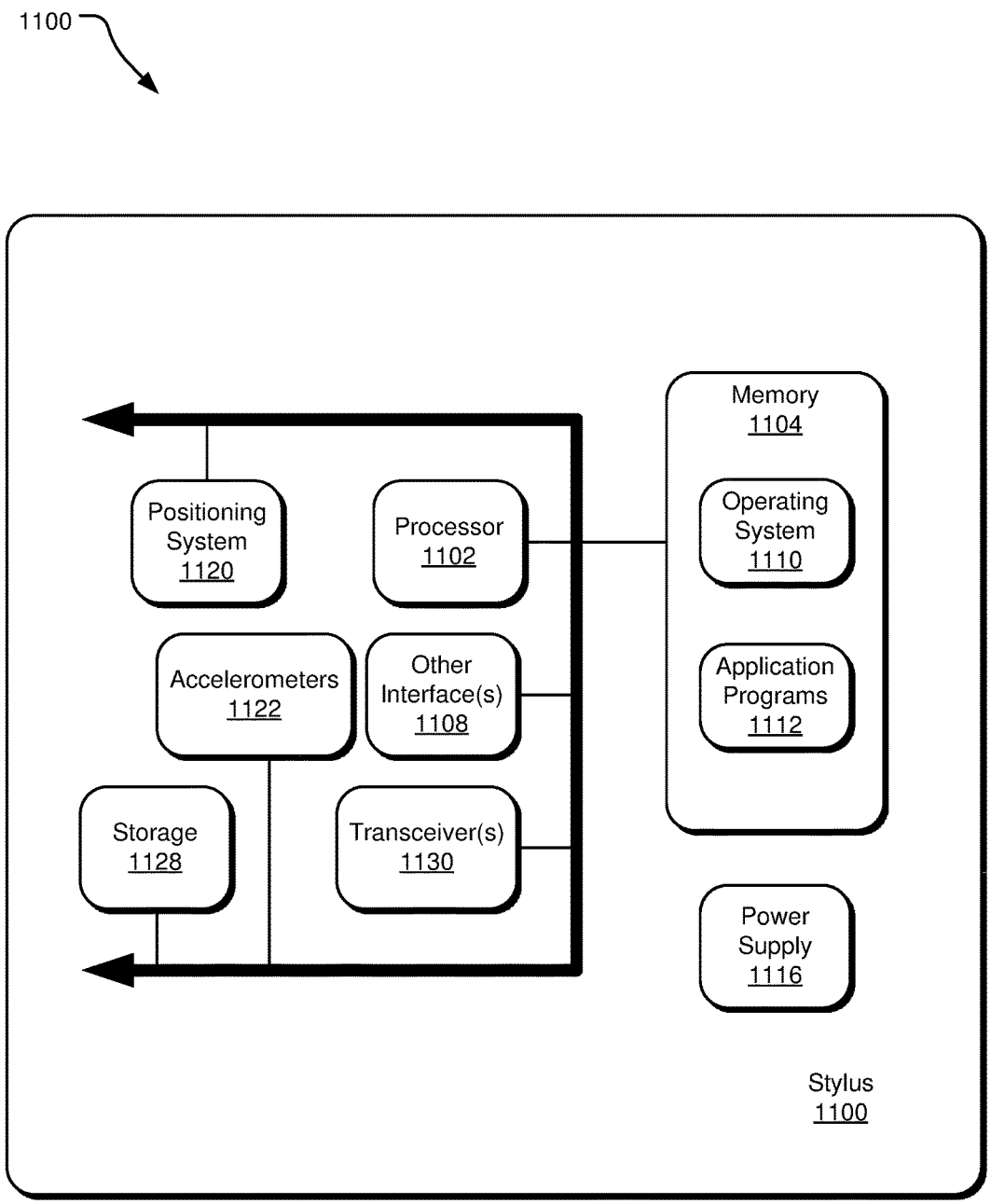
FIG. 11 illustrates an example system that may be useful in implementing the described technology.

FIG. 11 illustrates an example system (labeled as a stylus 1100) that may be useful in implementing the described technology. The stylus 1100 includes a processor 1102, a memory 1104, and other interfaces 1108 (e.g., buttons, fingerprint sensor, etc.). The memory 1104 generally includes both volatile memory (e.g., RAM) and non-volatile memory (e.g., flash memory). An operating system 1110, such as the Microsoft Windows® Phone operating system, resides in the memory 1104 and is executed by the processor 1102, although it should be understood that other operating systems may be employed.

One or more application programs 1112 are loaded in the memory 1104 and executed on the operating system 1108 by the processor 1102. The stylus 1100 includes a power supply 1116, which is powered by one or more batteries or other power sources and which provides power to other components of the stylus 1100. The power supply 1116 may also be connected to an external power source that overrides or recharges the built-in batteries or other power sources.

The stylus 1100 includes one or more communication transceivers 1130 to provide network connectivity (e.g., mobile phone network, Wi-Fi®, BlueTooth®, etc.). The stylus 1100 also includes various other components, such as a positioning system 1120 (e.g., a global positioning satellite transceiver), one or more accelerometers 1122, and additional storage 1128. Other configurations may also be employed. In an example implementation, a mobile operating system, various applications, and other modules and services may be embodied by instructions stored in memory 1104 and/or storage devices 1128 and processed by the processing unit 1102. The instructions stored in memory 1104 may include instructions for activating a power system in the stylus 1100, instructions for measuring electrical characteristics of circuits in the stylus 1100, instructions for measuring characteristics of environmental conditions surrounding the stylus 1100, and/or for storing data relating to measurements. User preferences, service options, and other data may be stored in memory 1104 and/or storage devices 1128 as persistent datastores.

An example stylus includes a stylus body and a tip disposed at the distal end of, and slidably connected to, the stylus body. A force sensor is disposed inside the stylus body, the force sensor having a first terminal and a second terminal, the first terminal electrically connected to a first exposed pad and the second terminal electrically connected to a second exposed pad. A conductive pad is configured to contact the first exposed pad and the second exposed pad when a force is applied to the tip.

Another example stylus of any preceeding stylus includes the first exposed pad and second exposed pad are disposed at varying heights with respect to the conductive pad.

Another example stylus of any preceeding stylus includes an ink condition is satisfied when the conductive pad contacts the first and second exposed pads.

Another example stylus of any preceeding stylus includes the tip is operatively connected to a first end of a spring assembly having a spring, the spring assembly disposed inside the stylus body.

Another example stylus of any preceeding stylus includes the force sensor is calibrated to report a zero value at the point in time when the conductive pad contacts the first exposed pad and the second exposed pad.

Another example stylus of any preceeding stylus includes the spring is pre-loaded.

Another example stylus of any preceeding stylus includes the electrical resistance of the conductive pad varies based on an applied force.

Another example stylus of any preceeding stylus includes a circuit is completed when the conductive pad contacts the first exposed pad and the second exposed pad.

Another example force sensor apparatus includes a force applicator including a force sensor having a first terminal and a second terminal, the first terminal electrically connected to a first exposed pad and the second terminal electrically connected to a second exposed pad. A conductive pad is configured to contact the first exposed pad and the second exposed pad when force is applied to the force applicator.

Another example force sensor apparatus includes the force applicator is slidably connected to a body.

Another example force sensor apparatus includes the force applicator is operatively connected to a first end of a spring assembly, the spring assembly being disposed inside the body.

Another example force sensor apparatus includes the conductive pad completes a circuit when the conductive pad contacts the first and second exposed pads.

Another example force sensor apparatus includes the force sensor is calibrated to report a zero value at the point in time when the conductive pad contacts the first exposed pad and the second exposed pad.

Another example force sensor apparatus includes the first exposed pad and second exposed pad are disposed at varying heights with respect to the conductive pad.

Another example force sensor apparatus includes the electrical resistance of the conductive pad varies based on an applied force.

An example method includes applying a force to a tip of a stylus, the tip operatively connected to a tip holder shaft disposed inside a stylus body and slidably coupled thereto, the tip holder shaft operatively connected to a spring configured to move a conductive pad into contact with a first exposed pad and a second exposed pad, the first exposed pad and second exposed pad electrically coupled to terminals of a force sensor.

Another example method of any preceeding method measuring an electrical characteristic at the force sensor.

Another example method of any preceeding method the electrical characteristic is electrical resistance. Another example method of any preceeding method the resistive sensor is calibrated to report a zero value at the point in time when the conductive pad contacts the first exposed pad and the second exposed pad.

Another example method of any preceeding method activating an ink mode of the stylus if the measured electrical characteristic at the resistive sensor satisfies an ink condition.

Another example method of any preceeding method the electrical resistance of the conductive pad varies based on an applied force.

Stylus 1100 may include a variety of tangible computer-readable storage media and intangible computer-readable communication signals. Tangible computer-readable storage can be embodied by any available media that can be accessed by the stylus 1100 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by stylus 1100. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A stylus comprising:
   a stylus body;
   a tip disposed at a distal end of, and slidably connected to, the stylus body;
   a force sensor disposed inside the stylus body, the force sensor having a first terminal and a second terminal, the first terminal electrically connected to a first exposed pad and the second terminal electrically connected to a second exposed pad; and
   a conductive pad configured to move toward and establish electrical contact with the first exposed pad and the second exposed pad to complete an electrical circuit, the completion of the electrical circuit initiating a current flow through the force sensor responsive to a force applied to the tip, a measurement of the force by the force sensor being initiated by the completion of the electrical circuit.

2. The stylus of claim 1, wherein the first exposed pad and second exposed pad are disposed at varying heights with respect to the conductive pad.

3. The stylus of claim 1, wherein an ink mode of the stylus is activated when the conductive pad contacts the first and second exposed pads, wherein a host device renders markings to a screen based on stylus input when the ink mode is activated but does not render markings to the screen based on stylus input when the ink mode is deactivated.

4. The stylus of claim 1, wherein the tip is operatively connected to a first end of a spring assembly having a spring, the spring assembly disposed inside the stylus body.

5. The stylus of claim 4, wherein the force sensor is calibrated to report a zero value at a point in time when the conductive pad contacts the first exposed pad and the second exposed pad.

6. The stylus of claim 4, wherein the spring is pre-loaded.

7. The stylus of claim 4, wherein an electrical resistance of the conductive pad varies based on an applied force.

8. The stylus of claim 1, wherein a circuit is completed when the conductive pad contacts the first exposed pad and the second exposed pad.

9. A force sensor apparatus comprising:
   a force applicator;
   a force sensor having a first terminal and a second terminal, the first terminal electrically connected to a first exposed pad and the second terminal electrically connected to a second exposed pad; and
   a conductive pad configured to move toward and establish electrical contact with the first exposed pad and the second exposed pad to complete an electrical circuit, the completion of the electrical circuit initiating a current flow through the force sensor responsive to force applied to the force applicator, a measurement of the force by the force sensor being initiated by the completion of the electrical circuit.

10. The force sensor apparatus of claim 9, wherein the force applicator is slidably connected to a body.

11. The force sensor apparatus of claim 10, wherein the force applicator is operatively connected to a first end of a spring assembly, the spring assembly being disposed inside the body.

12. The force sensor apparatus of claim 9, wherein the conductive pad completes a circuit when the conductive pad contacts the first and second exposed pads.

13. The force sensor apparatus of claim 12, wherein the force sensor is calibrated to report a zero value at a point in time when the conductive pad contacts the first exposed pad and the second exposed pad.

14. The force sensor apparatus of claim 9, wherein the first exposed pad and second exposed pad are disposed at varying heights with respect to the conductive pad.

15. The force sensor apparatus of claim 9, wherein an electrical resistance of the conductive pad varies based on an applied force.

16. A method comprising:
applying a force to a tip of a stylus, the tip operatively connected to a tip holder shaft disposed inside a stylus body and slidably coupled thereto, the tip holder shaft operatively connected to a spring configured to move a conductive pad into contact with a first exposed pad and a second exposed pad to complete an electrical circuit, the completion of the electrical circuit initiating a current flow through a force sensor responsive to the applied force, the first exposed pad and second exposed pad electrically coupled to terminals of the force sensor, a measurement of the force by the force sensor being initiated by the completion of the electrical circuit; and measuring an electrical characteristic at the force sensor.

17. The method of claim 16, wherein the electrical characteristic is electrical resistance.

18. The method of claim 16, wherein the force sensor is calibrated to report a zero value at a point in time when the conductive pad contacts the first exposed pad and the second exposed pad.

19. The method of claim 16, further comprising activating an ink mode of the stylus responsive to detection of the measured electrical characteristic satisfying a threshold, wherein a host device renders markings to a screen based on stylus input when the ink mode is activated but does not render markings to the screen based on stylus input when the ink mode is deactivated.

20. The method of claim 16, wherein an electrical resistance of the conductive pad varies based on an applied force.

* * * * *